(12) United States Patent
You et al.

(10) Patent No.: US 11,599,321 B2
(45) Date of Patent: Mar. 7, 2023

(54) ELECTRONIC DEVICE AND OPERATING METHOD THEREFOR

(71) Applicant: Samsung Electronics Co., Ltd., Gyeonggi-do (KR)

(72) Inventors: Myoungsoo You, Gyeonggi-do (KR); Jaewoo Suh, Gyeonggi-do (KR); Wooyoung Jung, Gyeonggi-do (KR)

(73) Assignee: Samsung Electronics Co., Ltd

( * ) Notice: Subject to any disclaimer, the term of this patent is extended or adjusted under 35 U.S.C. 154(b) by 72 days.

(21) Appl. No.: 16/975,340

(22) PCT Filed: Feb. 19, 2019

(86) PCT No.: PCT/KR2019/001935
§ 371 (c)(1),
(2) Date: Aug. 24, 2020

(87) PCT Pub. No.: WO2019/164204
PCT Pub. Date: Aug. 29, 2019

(65) Prior Publication Data
US 2020/0401360 A1    Dec. 24, 2020

(30) Foreign Application Priority Data

Feb. 23, 2018  (KR) ........................ 10-2018-0021736

(51) Int. Cl.
*G06F 3/14*    (2006.01)
*G06F 9/451*   (2018.01)
(Continued)

(52) U.S. Cl.
CPC ............ *G06F 3/1423* (2013.01); *G06F 9/451* (2018.02); *G06F 13/4282* (2013.01); *G06F 2213/0042* (2013.01); *H04L 2101/622* (2022.05)

(58) Field of Classification Search
CPC .... G06F 3/1423; G06F 9/451; G06F 13/4282; G06F 2213/0042; H04L 61/6022
See application file for complete search history.

(56) References Cited

U.S. PATENT DOCUMENTS

2004/0148445 A1* 7/2004 Lee ....................... G06F 1/1616
710/72
2009/0298514 A1* 12/2009 Ullah .................... H04L 67/306
340/572.1

(Continued)

FOREIGN PATENT DOCUMENTS

| JP | 4291803 | 7/2009 |
|----|---------|--------|
| JP | 4438199 | 3/2010 |

(Continued)

OTHER PUBLICATIONS

European Search Report dated Mar. 16, 2021 issued in counterpart application No. 19757772.9-1210, 15 pages.

(Continued)

*Primary Examiner* — Michael A Faragalla
*Assistant Examiner* — Sujit Shah
(74) *Attorney, Agent, or Firm* — The Farrell Law Firm, P.C.

(57) ABSTRACT

Provided are an electronic device and operating method, which includes a first operation, performed when the electronic device is not connected to an external output device, including displaying a first screen including a plurality of icons representing a plurality of application programs in a first format, and a second operation, performed when the electronic device is inserted into an external docking device for connecting to the external output device, including rendering a second screen including a plurality of icons displayed in the second format while the external docking device is connected to a wired local area network (LAN), and providing data associated with the second screen using (Continued)

the connector, and connecting the electronic device to the wired LAN through the connector using a first media access control address shared with the external device on the wired LAN.

15 Claims, 19 Drawing Sheets

(51) Int. Cl.
*G06F 13/42* (2006.01)
*H04L 101/622* (2022.01)

(56) References Cited

U.S. PATENT DOCUMENTS

| | | | | |
|---|---|---|---|---|
| 2012/0254494 | A1* | 10/2012 | Imai | G06F 1/1632 |
| | | | | 710/303 |
| 2014/0211801 | A1 | 7/2014 | Trainin et al. | |
| 2014/0245397 | A1 | 8/2014 | Lim et al. | |
| 2015/0036641 | A1 | 2/2015 | Eichen et al. | |
| 2015/0052278 | A1* | 2/2015 | Lo | G06F 13/4068 |
| | | | | 710/303 |
| 2015/0138094 | A1* | 5/2015 | Kim | G06F 1/1654 |
| | | | | 345/173 |
| 2016/0198402 | A1* | 7/2016 | Ko | H04W 48/20 |
| | | | | 370/329 |
| 2016/0366708 | A1* | 12/2016 | Yeom | H04W 4/80 |
| 2017/0279988 | A1* | 9/2017 | Tsuchiya | H04N 1/00307 |
| 2017/0339564 | A1* | 11/2017 | Momchilov | H04W 4/50 |
| 2017/0344333 | A1 | 11/2017 | Jin et al. | |
| 2017/0344507 | A1 | 11/2017 | Chen et al. | |

FOREIGN PATENT DOCUMENTS

| | | |
|---|---|---|
| JP | 2015056843 | 3/2015 |
| JP | 2016140098 | 8/2016 |
| KR | 1020040067665 | 7/2004 |
| KR | 1020140105318 | 9/2014 |
| KR | 1020150057645 | 5/2015 |
| KR | 101591306 | 2/2016 |

OTHER PUBLICATIONS

PCT/ISA/210 Search Report issued on PCT/KR2019/001935, dated May 20, 2019, pp. 5.
PCT/ISA/237 Written Opinion issued on PCT/KR2019/001935, dated May 20, 2019, pp. 5.
European Search Report dated Jun. 14, 2022 issued in counterpart application No. 19757772.9-1210, 18 pages.
Korean Office Action dated Oct. 7, 2022 issued in counterpart application No. 10-2018-0021736, 12 pages.

* cited by examiner

ELECTRONIC DEVICE AND OPERATING METHOD THEREFOR

PRIORITY

This application is a National Phase Entry of International Application No. PCT/KR2019/001935, which was filed on Feb. 19, 2019, and claims priority to Korean Patent Application No. 10-2018-0021736, filed in the Korean Intellectual Property Office on Feb. 23, 2018, the content of each of which is incorporated herein by reference.

TECHNICAL FIELD

Various embodiments relate to an electronic device for using a wired network through a docking device and a method of operating the electronic device.

BACKGROUND ART

With the development of mobile communication technology, an electronic device performs various data communication functions as well as voice call functions. The electronic device provides various services through various applications. The electronic device provides a multimedia service, for example, a music service, a video service, or a digital broadcast service, or a call, wireless Internet, short message service (SMS), multimedia messaging service (MMS), and the like which are network-based communication services. And, as the electronic device evolves from a simple communication medium to a device capable of various functions such as communication, distribution, the Internet, or payment, it has been used throughout the social, cultural, financial, or distribution industries.

As the electronic device is inserted into a docking device, it operates in a usage environment similar to that of a general personal computer. That is, the electronic device uses a wired network through a docking device. For example, the electronic device uses a service provided by an external device through the wired network.

DISCLOSURE OF INVENTION

Technical Problem

However, the electronic device as described above uses a wired network based on a media access control (MAC) address of the docking device. Due to this, there is a problem that the external device only identifies the docking device, and the electronic device is not identified. Accordingly, the external device is not able to allow or block the use of the wired network of the electronic device.

Solution to Problem

According to various embodiments, an electronic device includes a housing, a display exposed through the first portion of the housing, a wireless communication circuit disposed inside the housing, an electrical connector exposed through the second portion of the housing, a processor electrically connected to the display, the communication circuit, and the connector, and a memory electrically connected to the processor.

According to various embodiments, the memory stores instructions, when executed, causing the processor, in a first operation, to display, in a first format, a first screen including a plurality of icons representing a plurality of application programs on the display based on that the electronic device is not connected to an external output (display) device, and, in a second operation, to render a second screen including the plurality of icons in a second format while an external docking device is connected to a wired local area network (LAN) when the electronic device is inserted into the external docking device using the connector and is connected with the external output device through the external docking device, and to provide data related to the second screen to the external output device through the connector so that the external output device displays the second screen, and to connect the electronic device to the wired LAN through the connector using a first MAC address shared with an external device on the wired LAN.

According to various embodiments of the present disclosure, a method of operating the electronic device includes a first operation performed when the electronic device is not connected to an external output device, and a second operation performed while an external docking device is connected to a wired LAN when the electronic device is inserted into the external docking device using a connector, and is connected to the external output device through the external docking device.

According to various embodiments, the first operation includes displaying the first screen including the plurality of icons representing the plurality of application programs in the first format.

According to various embodiments, the second operation includes rendering the second screen including the plurality of icons in the second format, and providing the external output device with data associated with the second screen through the connector so that the external output device displays the second screen, and connecting the electronic device to the wired LAN through the connector using a first MAC address shared with the external device on the wired LAN.

According to various embodiments, a non-transitory computer-readable storage medium stores one or more programs for performing a first operation performed when an electronic device is not connected to an external output device and for performing a second operation performed while an external docking device is connected to a wired LAN when the electronic device is inserted into the external docking device using a connector and is connected to the external output device through the external docking device.

According to various embodiments, the first operation includes displaying a first screen including a plurality of icons representing a plurality of application programs in a first format.

According to various embodiments, the second operation includes rendering a second screen including the plurality of icons in a second format, and providing the external output device with data associated with the second screen through the connector so that the external output device displays the second screen, and connecting the electronic device to the wired LAN through the connector using a first MAC address shared with the external device on the wired LAN.

Advantageous Effects of Invention

According to various embodiments, an electronic device generates a unique MAC address and use it to connect to a wired network. Through this, even if the electronic device is inserted into the docking device, the electronic device is able to use a wired network based on the unique MAC address. Accordingly, since the external device is able to identify the electronic device, the use range of the network is controlled by allowing or blocking the use of the wired network for the electronic device.

BEST MODE FOR CARRYING OUT THE INVENTION

Hereinafter, various embodiments of the document will be described with reference to the accompanying drawings.

Figure 1:
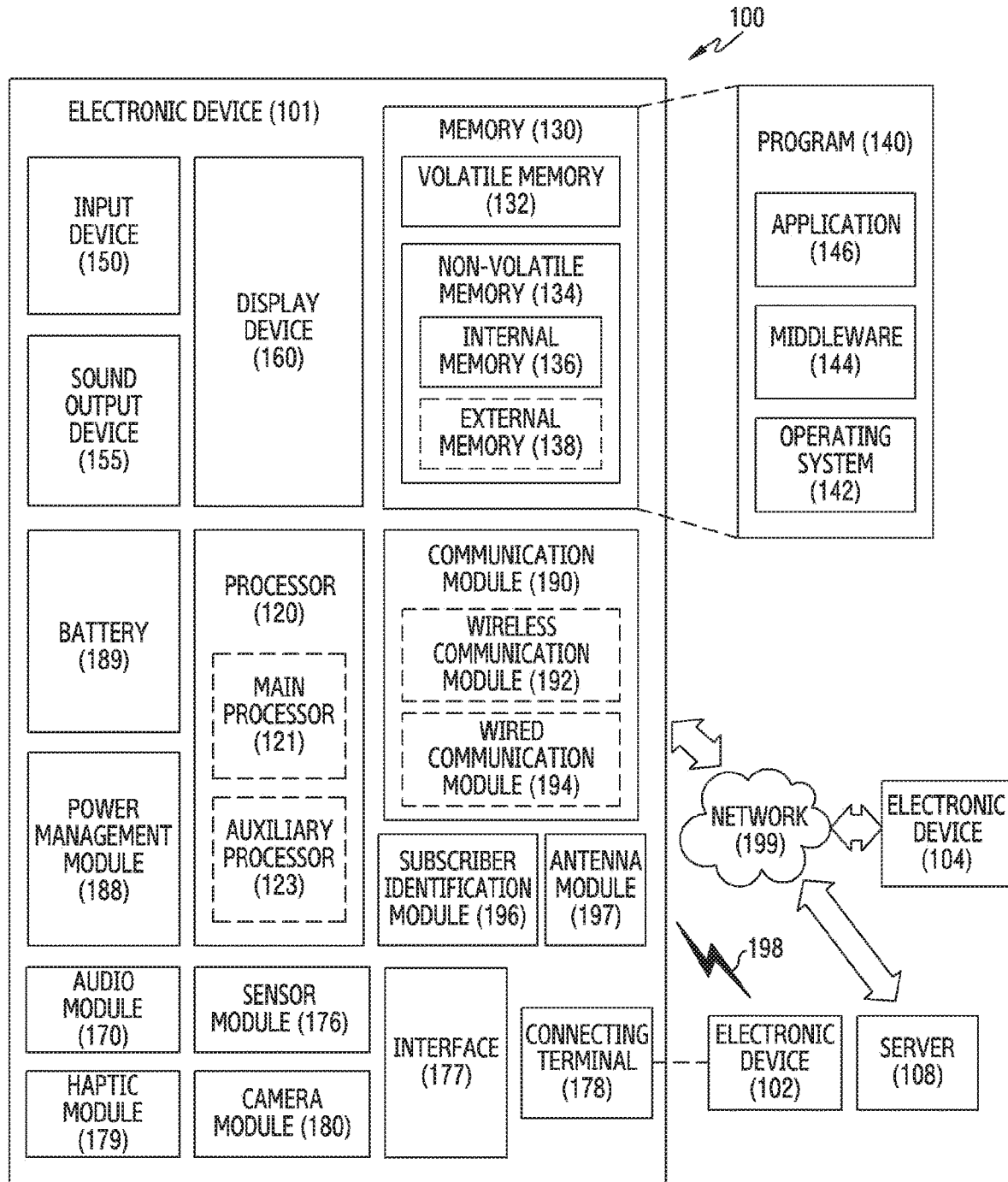
FIG. 1 is a block diagram of an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
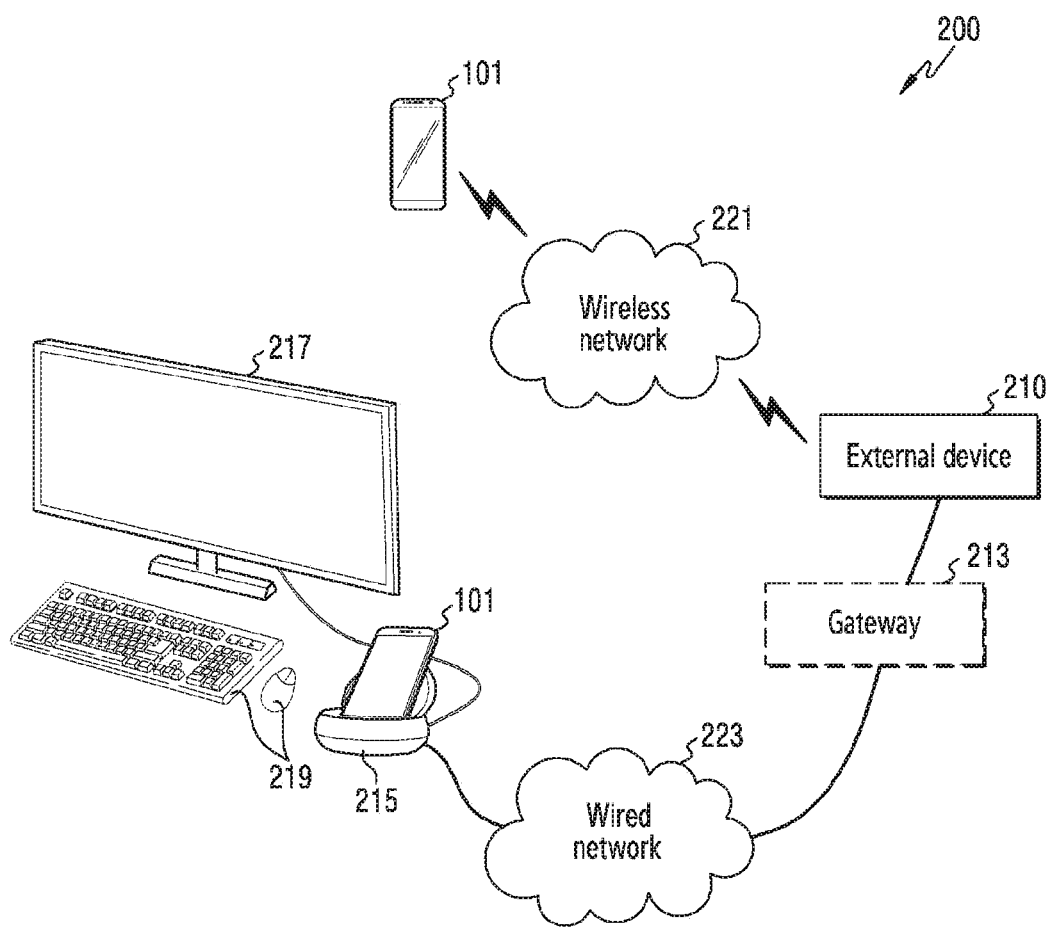
FIG. 2 is a structural diagram of a system according to various embodiments.

FIG. 2 is a structural diagram of a system 200 according to various embodiments.

Referring to FIG. 2, the system 200 includes an electronic device 101, an external device 210, an external docking device 215, an external output device 217 and an external input device 219.

The electronic device 101 communicates with the external device 210 through a wireless network 221 (e.g., short-range wireless communication), or through a wired network 223 (e.g., a wired local area network (LAN)). To this end, the electronic device 101 supports a desktop extension (DeX) mode. And it is connected to the network 223 through the docking device 215 in the desktop extension mode. As the electronic device 101 is inserted into the docking device 215, it operates in the desktop extended mode. The electronic device 101 includes a housing. The communication module 190 is disposed inside the housing. The display device 160 is exposed through the first portion of the housing, and the connector is exposed through the second portion of the housing. The electronic device 101 is inserted into the docking device 215 and is electrically connected to the docking device 215 via an electrical connector of a connection terminal 178. For example, the connector comprises a universal serial bus (USB) connector.

The electronic device 101 is electrically connected to the external output device 217 and the external input device 219 through the docking device 215 in the desktop extended mode. Through this, in the desktop extended mode, a use environment similar to that of a general personal computer is provided. For example, the electronic device 101 serves as a main body of the personal computer, and the external output device 217 serves as an output part of the personal computer, and the external input device 219 serves as an input part of the personal computer. The electronic device 101 displays a user interface similar to Windows™ OS on the external output apparatus 217. To this end, the electronic device 101 fits the user interface (UI) or environment information related to the user interface (e.g., information about resolution, density, or orientation etc) in the desktop extended mode to the external output device 217. The electronic device 101 receives a user input through the external input device 219 in the desktop extended mode.

The external device 210 provides a service to the electronic device 101 through the wired network 223. For example, the external device 210 is a mobile device management (MDM) server. According to an embodiment, the external device 210 transmits a policy in association with an MDM client installed in the electronic device 101 to provide a service, and manages the electronic device 101 based on the policy. The external device 210 is connected to the docking device 215 through the wired network 223. According to an embodiment, the external device 210 is directly connected to the docking device 215. According to another embodiment, the external device 210 is connected to the docking device 215 through a gateway 213. Through this, the external device 210 communicates with the electronic device 101 through the wired network 223.

The docking device 215 connects the electronic device 101 to the external device 210 through the wired network 223. As the docking device 215 is connected to the wired network 213 using a cable and the electronic device 101 is inserted into the docking device 215, the electronic device 101 is connected to the external device 210. In addition, the docking device 215 connects the electronic device 101 to the external output device 217 and the external input device 219. For example, the docking device 215 connects, in a wireless way or a wired way, the electronic device 101 to the external output device 217 and the external input device 219.

The external output device 217 outputs at least one of video data or audio data. The external output device 217 outputs at least one of video data or audio data received from the electronic device 101 through the docking device 215. For example, the external output device 217 includes at least one of a display, a speaker, a headset, or an earphone.

The external input device 219 receives user input. According to an embodiment, the external input device 219 is, in a wireless way or a wired way, connected to the electronic device 101. According to another embodiment, the external input device 219 is, in a wireless way or a wired way, connected to the docking device 215. For example, the external input device 219 includes at least one of a mouse, a keyboard, a joystick, a microphone, or a remote controller.

Figure 3:
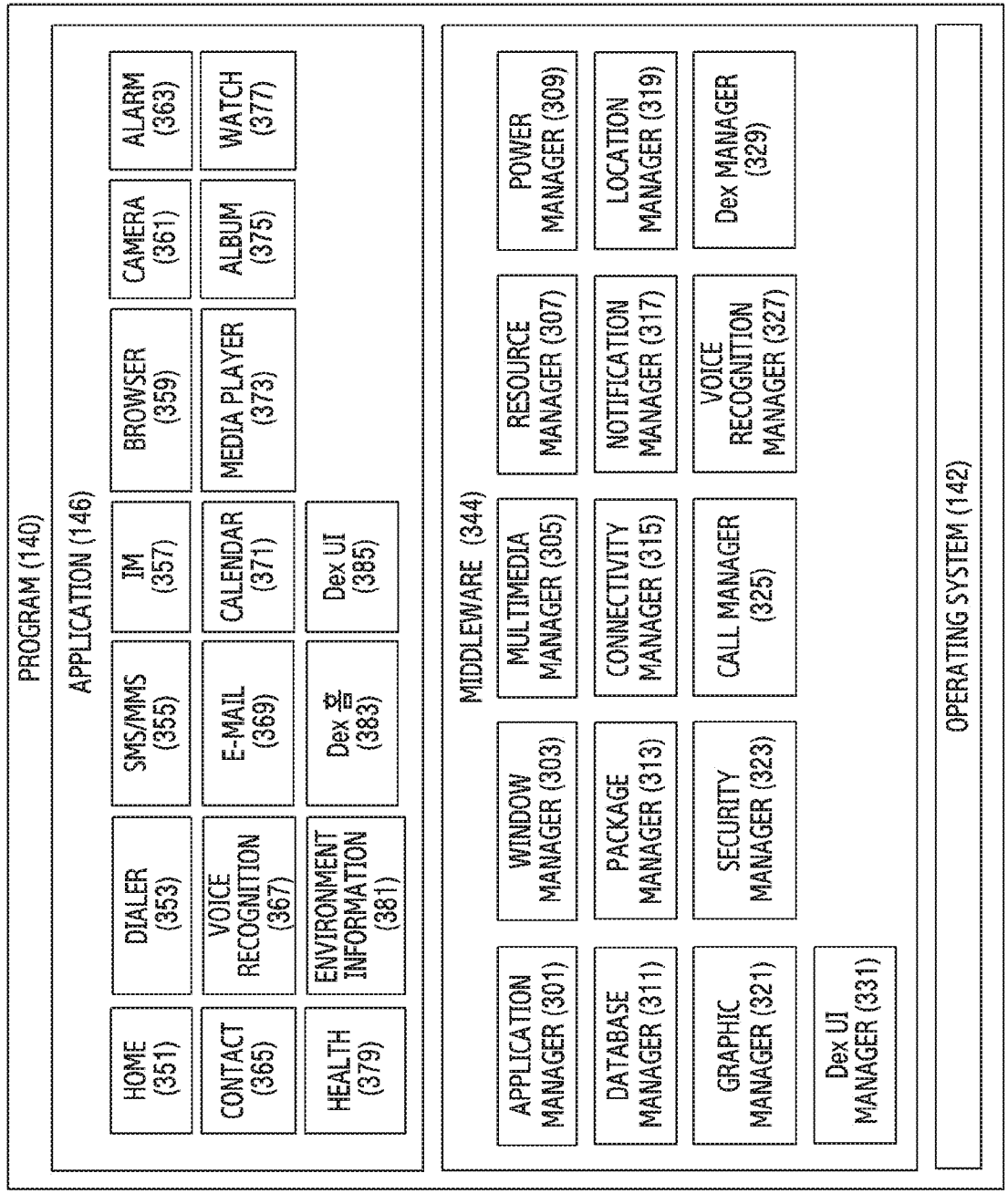
FIG. 3 is a block diagram illustrating a program according to various embodiments.

FIG. 3 is a block diagram 300 illustrating the program 140 according to various embodiments.

Referring to FIG. 3, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 301, a window manager 303, a multimedia manager 305, a resource manager 307, a power manager 309, a database manager 311, a package manager 313, a connectivity manager 315, a notification manager 317, a location manager 319, a graphic manager 321, a security manager 323, a telephony manager 325, or a voice recognition manager 327.

The application manager 301, for example, may manage the life cycle of the application 146. The window manager 303, for example, may manage one or more graphical user interface (GUI) resources that are used on a screen. The multimedia manager 305, for example, may identify one or more formats to be used to play media files, and may encode or decode a corresponding one of the media files using a codec appropriate for a corresponding format selected from the one or more formats. The resource manager 307, for example, may manage the source code of the application 146 or a memory space of the memory 130. The power manager 309, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 309 may interwork with a basic input/output system (BIOS) (not shown) of the electronic device 101.

The database manager 311, for example, may generate, search, or change a database to be used by the application 146. The package manager 313, for example, may manage installation or update of an application that is distributed in the form of a package file. The connectivity manager 315, for example, may manage a wireless connection or a direct connection between the electronic device 101 and the external electronic device. The notification manager 317, for example, may provide a function to notify a user of an occurrence of a specified event (e.g., an incoming call, message, or alert). The location manager 319, for example, may manage locational information on the electronic device 101. The graphic manager 321, for example, may manage one or more graphic effects to be offered to a user or a user interface related to the one or more graphic effects.

The security manager 323, for example, may provide system security or user authentication. The telephony manager 325, for example, may manage a voice call function or a video call function provided by the electronic device 101. The voice recognition manager 327, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 344 may dynamically delete some existing components or add new components. According to an embodiment, at least part of the middleware 144 may be included as part of the OS 142 or may be implemented as another software separate from the OS 142.

The DeX manager 329 manages the desktop extension mode. For example, the DeX manager 429 applies or restores settings that are applied to components of the electronic device 101 as the desktop extension mode is executed. The DeX UI manager 331 manages user interface resources associated with the desktop extension mode.

The application 146 may include, for example, a home 351, dialer 353, short message service (SMS)/multimedia messaging service (MMS) 355, instant message (IM) 357, browser 359, camera 361, alarm 363, contact 365, voice recognition 367, email 369, calendar 371, media player 373, album 375, watch 377, health 379 (e.g., for measuring the degree of workout or biometric information, such as blood sugar), or environmental information 381 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 369) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

The DeX home 483 application operates as a launcher running in the desktop extended mode. For example, the DeX home 483 application supports at least one of functions related to icons associated with the desktop extension mode such as creation, deletion, movement, association, or selection. The DeX UI 485 application provides a user interface associated with the desktop extension mode. For example, the user interface associated with the desktop extension mode includes at least one of a notification, a presentation, a dialog, or a touch pad.

Figure 4A:
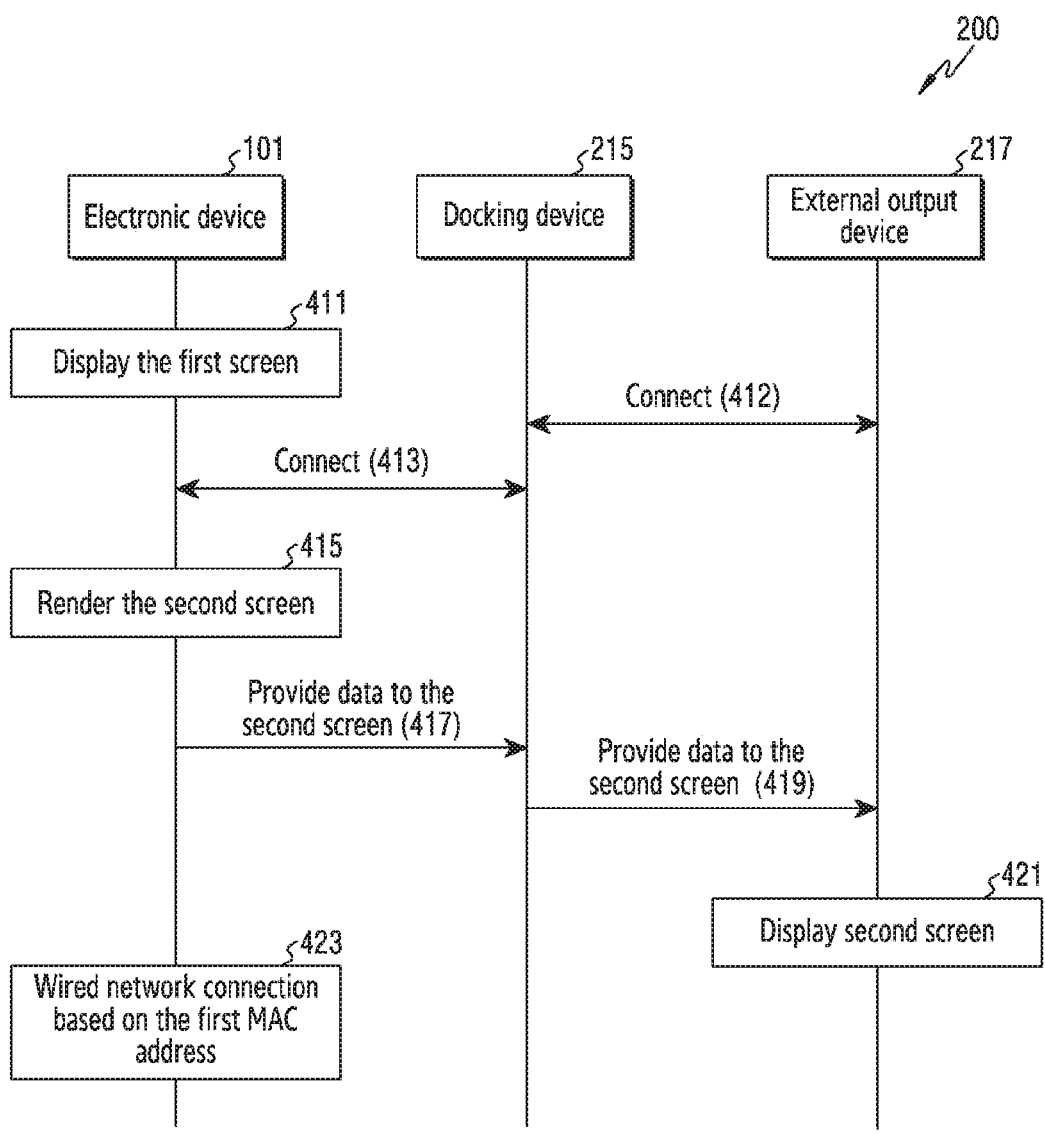
FIG. 4A is a signal flow diagram in a system according to various embodiments.

FIG. 4A is a signal flow diagram of an electronic device 101, a docking device 215, and an external output device 217 in the system 200 according to various embodiments.

Referring to FIG. 4, the electronic device 101 displays the first screen in operation 411. The first screen includes a plurality of icons representing a plurality of application programs. When the electronic device 101 is not inserted into the docking device 215, the processor 120 displays the first screen in the first format. If the electronic device 101 is not connected to the external output device 217 through the docking device 215, the processor 120 displays the first screen through the display device 160.

The electronic device 101 is electrically connected to the docking device 215 in operation 413. As the electronic device 101 is inserted into the docking device 215, it is connected to the docking device 215 through a connector. The docking device 215 is connected to the external output device 217 in operation 412. The docking device 215 is connected to the external output device 217 in a wireless way or a wired way. Through this, the electronic device 101 is connected to the external output device 217 through the docking device 215 in operation 513. The processor 120 is connected to the external output device 217 through the connector.

When the electronic device 101 is connected to the docking device 215 in operation 413, the electronic device 101 renders the second screen in operation 415. The processor 120 renders the second screen in the second format. The second screen includes a plurality of icons representing a plurality of application programs. The electronic device 101 provides data associated with the second screen to the docking device 215 in operation 417. The processor 120 provides data associated with the second screen to the docking device 215 through the connector. The docking device 215 provides data related to the second screen to the external output device 217 in operation 419. The docking device 215 provides data associated with the second screen to the external output device 217 in a wireless way or a wired way. Through this, the external output device 217 displays the second screen in operation 421.

The electronic device 101 is connected to the wired network 223 based on a first MAC address in operation 423. Accordingly, the electronic device 101 is connected to the external device 210 through the wired network 223. The processor 120 is connected to the wired network 223 through the docking device 215. The wired network 223 includes, for example, a wired LAN.

Figure 4B:
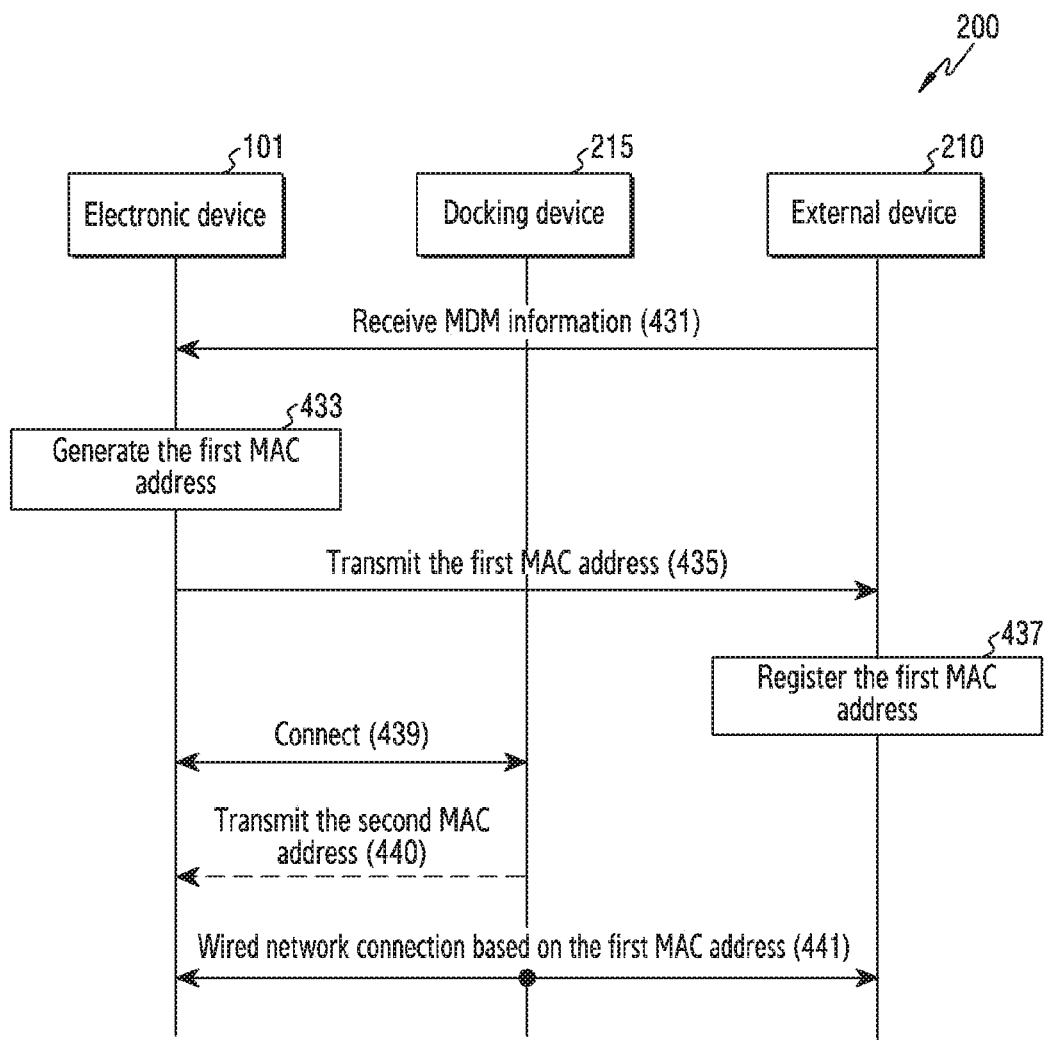
FIG. 4B is a signal flow diagram in a system according to various embodiments.

FIG. 4B is a signal flow diagram of an electronic device 101, a docking device 215, and an external device 210 in the system 200 according to various embodiments.

Referring to FIG. 4B, the electronic device 101 receives mobile device management (MDM) information from the external device 210 in operation 431. When the electronic device 101 is not inserted into the docking device 215, the processor 120 receives MDM information from the external device 210 through the communication module 190. The electronic device 101 receives MDM information for using of the wired network 323 through the wireless network 221. For example, the electronic device 101 includes an MDM client, and the MDM client receives MDM information from the external device 210 based on a predetermined time, a location, or an event.

The electronic device 101 generates a first MAC address in operation 433. The processor 120 generates the first MAC address in response to the MDM information. For example, the processor 120 generates the first MAC address in response to MDM information.

The electronic device 101 transmits the first MAC address to the external device 210 in operation 435. The processor 120 transmits the first MAC address to the external device 210 through the wireless network 221. According to an embodiment, the external device 210 reads the first MAC address from the electronic device 101. The processor 120 transmits user information of the electronic device 101 together with the first MAC address to the external device 210 through the communication module 190. For example, the user information includes at least one of user name, contact information, or affiliation information.

The external device 210 registers the first MAC address in operation 437. The external device 210 registers the first MAC address in response to user information. The external device 210 sets authority for using the wired network 223 of the electronic device 101 based on the user information. For example, the external device 210 allows or blocks the use of the wired network 223 for the electronic device 101, and determines the use range of the wired network 223 for the electronic device 101. The external device 210 registers the authority of the electronic device 101 corresponding to the first MAC address. According to an embodiment, the external device 210 transmits at least one of the first MAC address, user information, or authority to a gateway 213 and shares with the gateway 213.

The electronic device 101 is electrically connected to the docking device 215 in operation 439. As the electronic device 101 is inserted into the docking device 215, it is connected to the docking device 215 through a connector.

The electronic device 101 is connected to the external device 210 through the wired network 223 based on the first MAC address in operation 441. The processor 120 is connected to the wired network 223 through the docking device 215. The wired network 223 includes, for example, a wired LAN. According to an embodiment, the electronic device 101 receives a second MAC address from the docking device 215 in operation 440. Through this, the electronic device 101 is connected to the wired network 223 using the first MAC address in response to the second MAC address in operation 441. The second MAC address is stored in the docking device 215, and the docking device 215 uses it to connect to the wired LAN and, for example, includes the second MAC address. If the external device 210 sets the permission for the electronic device 101 to use the wired network 223 based on the first MAC address, the processor 120 is connected to the wired network 223 through the docking device 215. For example, the electronic device 101 causes the docking device 215 to use the first MAC address for connection to a wired LAN. Through this, the processor 120 uses the wired network 223 based on the first MAC address.

The electronic device 101 according to various embodiments includes a housing, a display exposed through a first portion of the housing, a wireless communication circuit disposed inside the housing, and an electrical connector exposed through a second portion of the housing, a display, and a processor 120 electrically connected to the communication circuit and the connector, and a memory 130 electrically connected to the processor 120.

According to various embodiments, the memory 130 stores the instructions, when executed, cause the processor 120, in the first operation, to display a first screen including a plurality of icons representing a plurality of application programs on a display in a first format if the electronic device 101 is not connected to the external output device 217, and in a second operation, while the external docking device 215 is connected to the wired local area network (LAN) when the electronic device is inserted into the external docking device using a connector and connected to the external output device through the external docking device, to render a second screen including the plurality of icons of the first screen in a second format, to provide data related to the second screen to the external output device through the connector for the external output device to display the second screen, and to connect the electronic device to the wired LAN through the connector using a first media access control (MAC) address shared with an external device on the wired LAN According to various embodiments, the connector includes a universal serial bus (USB) connector.

According to various embodiments, the instructions further cause the processor 120 to receive mobile device management (MDM) information from the external device 210 and generate the first MAC address in response to the MDM information.

According to various embodiments, the instructions further cause the processor 120 to generate the first MAC address using the WiFi MAC address.

According to various embodiments, the instructions cause the processor 120 to process the WiFi MAC address using a bit masking algorithm to generate the first MAC address.

According to various embodiments, the instructions cause the processor 120, in the second operation, to receive the second MAC address stored in the docking device 215 from the docking device 215 and, after receiving the second MAC address, to let the docking device 215 to use the first MAC address to connect to the wired LAN.

According to various embodiments, the instructions cause the processor 120, in the second operation, to provide the docking device 215 with a request for the second MAC address, and after providing the request, to receive a second MAC address from the docking device 215.

According to various embodiments, the instructions cause the processor 120, in the second operation, to display a user interface (UI) including at least a portion of the first MAC address on the display.

Figure 5:
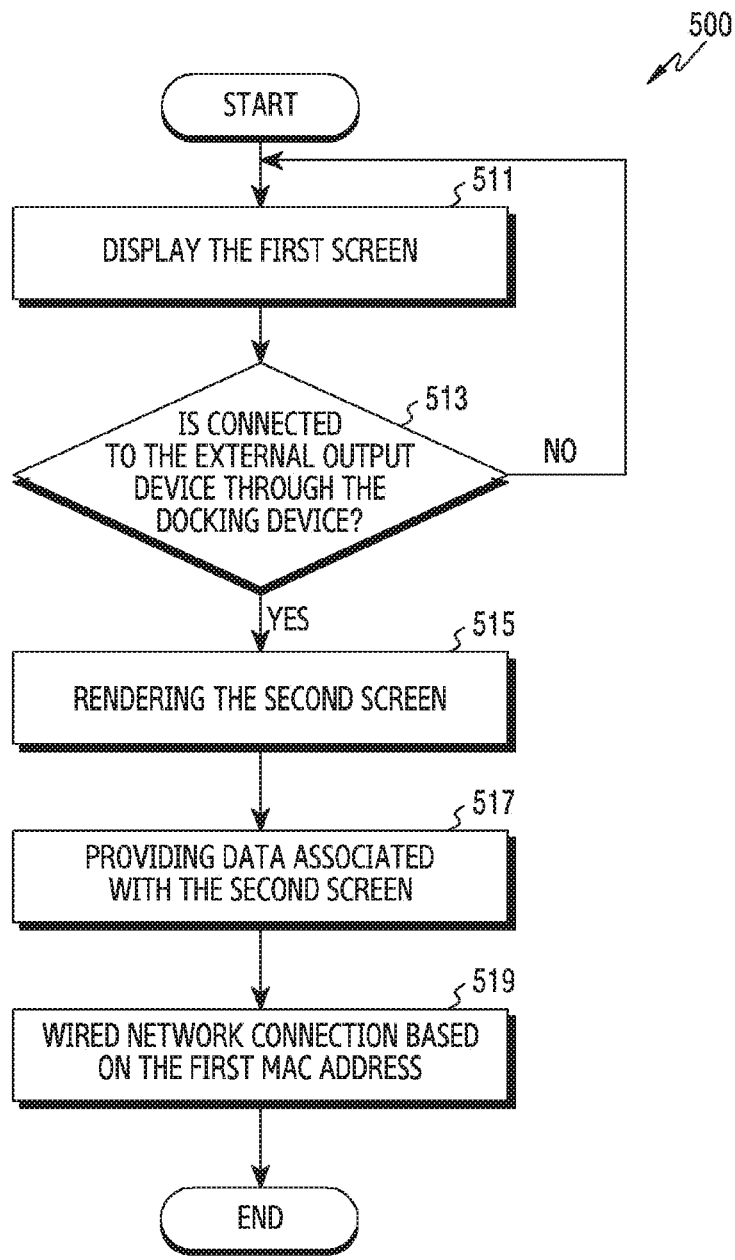
FIG. 5 is a flowchart of a method of operating an electronic device according to various embodiments.

FIG. 5 is a flowchart of an operation method 500 of an electronic device 101 according to various embodiments.

Referring to FIG. 5, the electronic device 101 displays the first screen in operation 511. The first screen includes a plurality of icons representing a plurality of application programs. The processor 120 displays the first screen in the first format.

In operation 513, the electronic device 101 determines whether the electronic device 101 is connected to the external output device through the docking device 215. If the electronic device 101 is not connected to the external output device 217 through the docking device 215, the electronic device 101 continues to display the first screen.

When the electronic device 101 is connected to the external output device 217 through the docking device 215 in operation 513, the electronic device 101 renders the second screen in operation 515. The electronic device 101 is inserted into the docking device 215 and connected to the external output device 217 through the docking device 215. The processor 120 renders the second screen in the second format. The second screen includes a plurality of icons representing a plurality of application programs. The electronic device 101 provides data associated with the second screen to the docking device 215 in operation 517. The processor 120 provides data associated with the second screen to the docking device 215 through a connector. The processor 120 provides data associated to the second screen to the external output device 217 through the docking device 215.

The electronic device 101 is connected to the wired network 223 based on the first MAC address in operation 519. While the docking device 215 is connected to the wired network 223, the processor 120 is connected to the wired network 223 through the docking device 215 based on the first MAC address. The processor 120 is connected to the external device 210 through the wired network 223. The wired network 223 includes, for example, a wired LAN.

Figure 6:
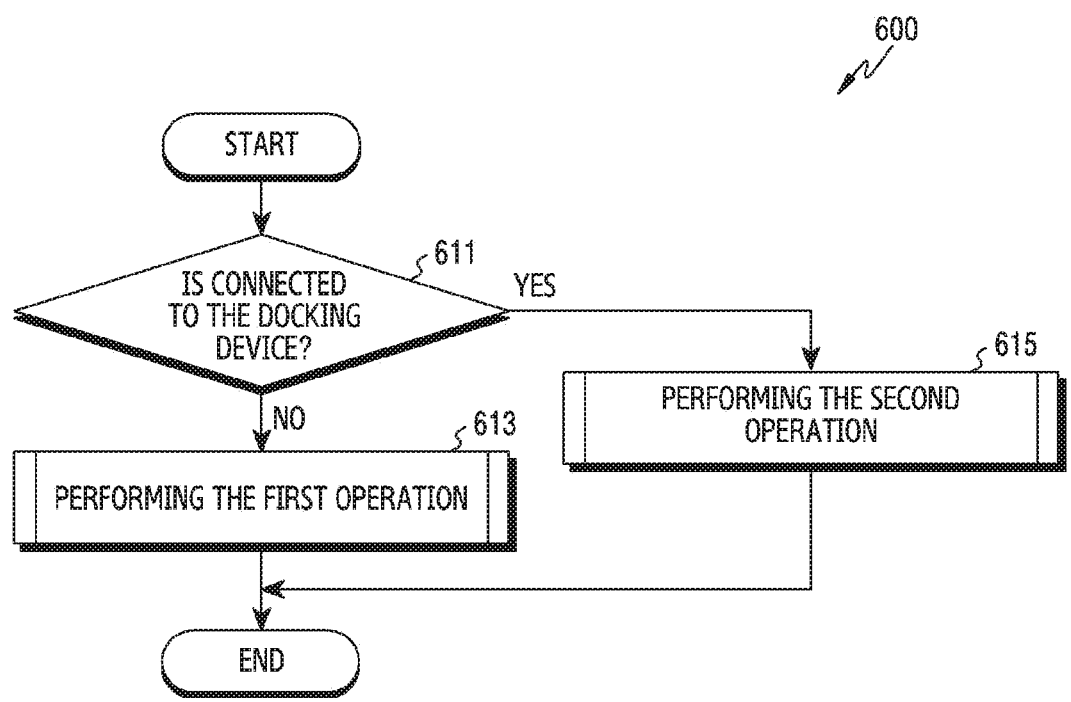
FIG. 6 is a flowchart of an operation method of an electronic device according to various embodiments.

FIG. 6 is a flowchart of an operation method 600 of an electronic device 101 according to various embodiments.

Referring to FIG. 6, in operation 611, the processor 120 determines whether the electronic device is connected to the docking device. If the electronic device 101 is not connected to the docking device 215, the electronic device 101 performs the first operation in operation 613. When the electronic device 101 is not inserted into the docking device 215, the processor 120 performs the first operation. If the electronic device 101 is not connected to the external output device 217 and the external input device 219 through the docking device 215, the processor 120 perform the first operation.

Figure 7:
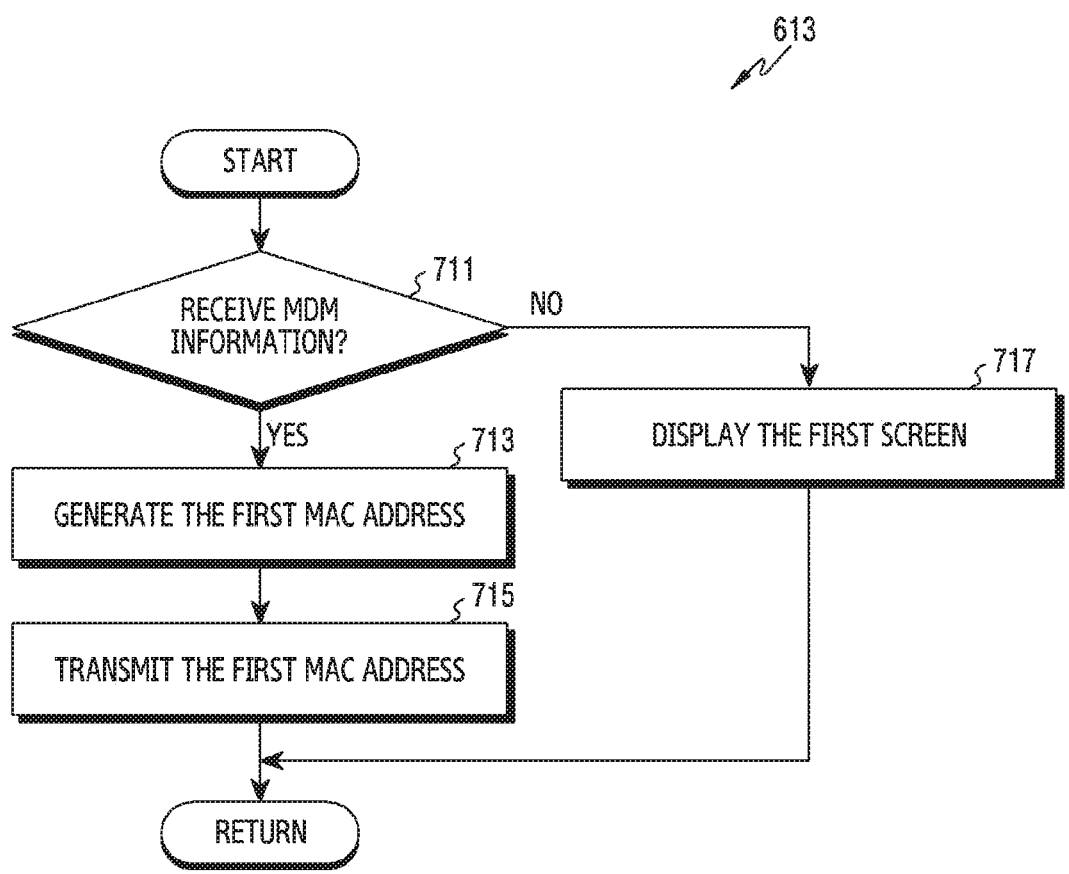
FIG. 7 is a flowchart of the first operation of FIG. 6.
Figure 8:
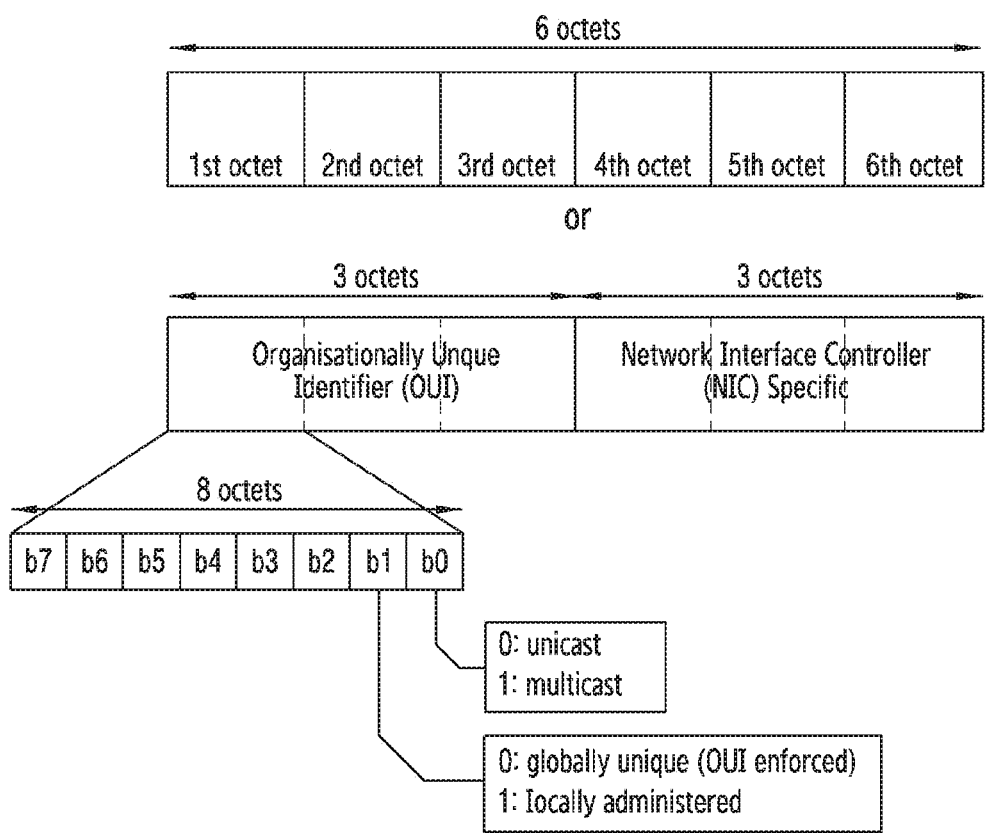
FIG. 8 is an exemplary data structure of the first MAC address in FIG. 7.
Figure 9A:
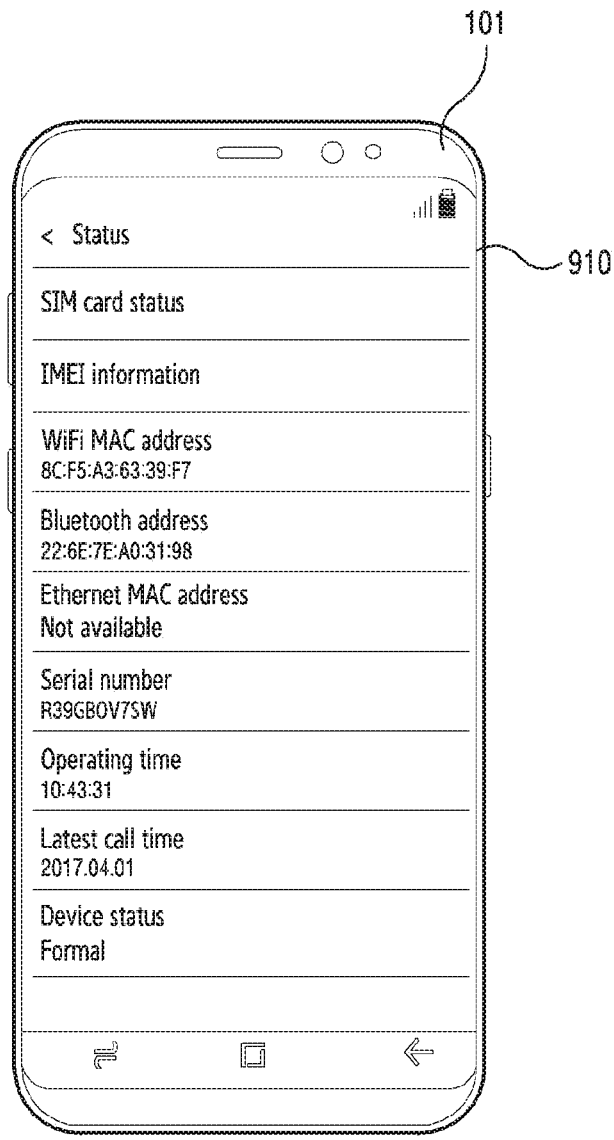
FIG. 9A and FIG. 9B are exemplary views of the first screen of FIG. 7.
Figure 9B:
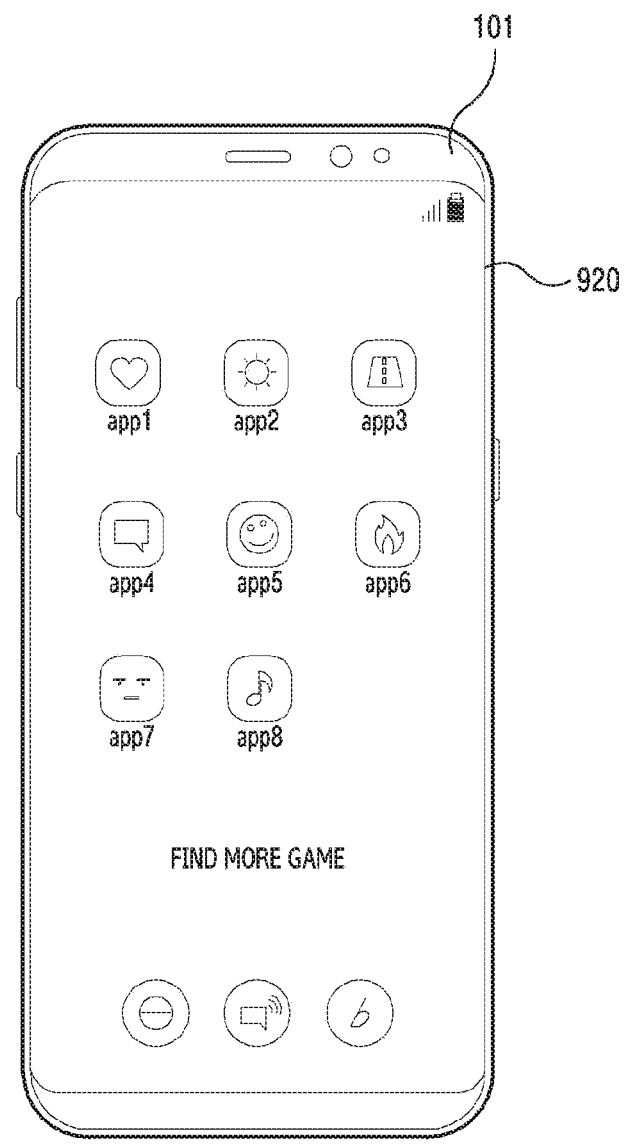

FIG. 7 is a flowchart of the first operation 613 of FIG. 6. Hereinafter, operations of FIG. 7 are at least some of operation 613 of FIG. 6. FIG. 8 is an exemplary data structure of the first MAC address of FIG. 7. FIG. 9A and FIG. 9B are exemplary views of the first screen 910 of FIG. 7.

Referring to FIG. 7, the electronic device 101 determines whether MDM information is received in operation 711. The electronic device 101 receives MDM information. The processor 120 receives MDM information from the external device 210 through the communication module 190. The electronic device 101 receives MDM information through the wireless network 221. For example, the electronic device 101 includes an MDM client, and the MDM client receives MDM information from the external device 210 based on a predetermined time, a location, or an event.

When MDM information is received, the electronic device 101 generates a first MAC address in operation 713. The processor 120 generates the first MAC address in response to receiving the MDM information. For example, the processor 120 generates the first MAC address in response to receiving the MDM information. The processor 120 generates the first MAC address using a pre-stored MAC address for use in connecting to the wireless network 221, and stores the first MAC address. For example, the pre-stored MAC address includes a BT MAC address or a WiFi MAC address, or both of the BT MAC address and the WiFi MAC address. According to an embodiment, the processor 120 generates the first MAC address using the BT MAC address. According to another embodiment, the processor 120 generates the first MAC address using the WiFi MAC address.

For example, the processor 120 processes the WiFi MAC address with bit masking algorithm and generates the first MAC address. The WiFi MAC address and the first MAC address have the same data structure as shown in FIG. 8. The WiFi MAC address and the first MAC address are formed of a row of six octets. Each octet is formed of a row of eight bits. The processor 120 generates the first MAC address by changing the second and fifth octets in the WiFi MAC address. To this end, the processor 120 applies 0x02 and OR functions to the fifth bit, the sixth bit, the seventh bit and the eighth bit of the second octets in the WiFi MAC address, and applies 0x40 and XOR functions to the first bit, the second bit, the third bit and the fourth bit of the fifth octets in the WiFi MAC address. For example, if the WiFi MAC address is '8C: F5: A3: 63: 79: F7', the processor 120 applies the 0x02 and OR functions to 'C (1100)' of the second octet to produce 'E (1110)' and applies the 0x40 and XOR functions to '3 (0011)' of the fifth octet to produce '7 (0111)'. Through this, the processor 120 generates '8E: F5: A 3: 63: 79: FC' as the first MAC address.

The electronic device 101 transmits the first MAC address to the external device 210 in operation 715. The processor 120 transmits the first MAC address to the external device 210 through the wireless network 221. According to an embodiment, the processor 120 receives a request for the first MAC address from the external device 210 through the communication module 190. Through this, the processor 120 transmits the first MAC address to the external device 210 through the communication module 190 in response to the request from the external device 210. The processor 120 transmits user information of the electronic device 101 to the external device 210 together with the first MAC address. For example, the user information includes at least one of a user name, contact information, or affiliation information. The processor 120 further transmits not only the user information of the electronic device 101, but also identification information of the electronic device 101 such as an international mobile equipment identity (IMEI) or an international mobile subscriber identity (IMSI).

If MDM information is not received in operation 711, the electronic device 101 displays the first screen 910 in operation 717. The first screen 910 includes a plurality of icons representing a plurality of application programs. The processor 120 displays the first screen 910 in the first format. The processor 120 displays the first screen 910 through the display device 160 as illustrated in FIG. 9A. In addition, the processor 120 displays the user interface 920 including at least a portion of a MAC address pre-stored through the display device 160 as illustrated in FIG. 9B. The user interface 920 includes at least a portion of the pre-stored MAC address, but does not include the first MAC address. For example, even if the first MAC address is generated, the processor 120 displays, through the user interface 920, the WiFi MAC address, for example, '8C: F5: A3: 63: 79: F7' but does not display the first MAC address, for example, '8E: F5: A3: 63: 79: FC'.

When the electronic device 101 is connected to the docking device 215 in operation 611, the electronic device 101 performs the second operation in operation 615. When the electronic device 101 is inserted into the docking device 215, the processor 120 performs the second operation. When the electronic device 101 is connected to the external output device 217 and the external input device 219 through the docking device 215, the processor 120 performs the second operation. In the second operation, the processor 120 operates in the desktop extended mode.

Figure 10:
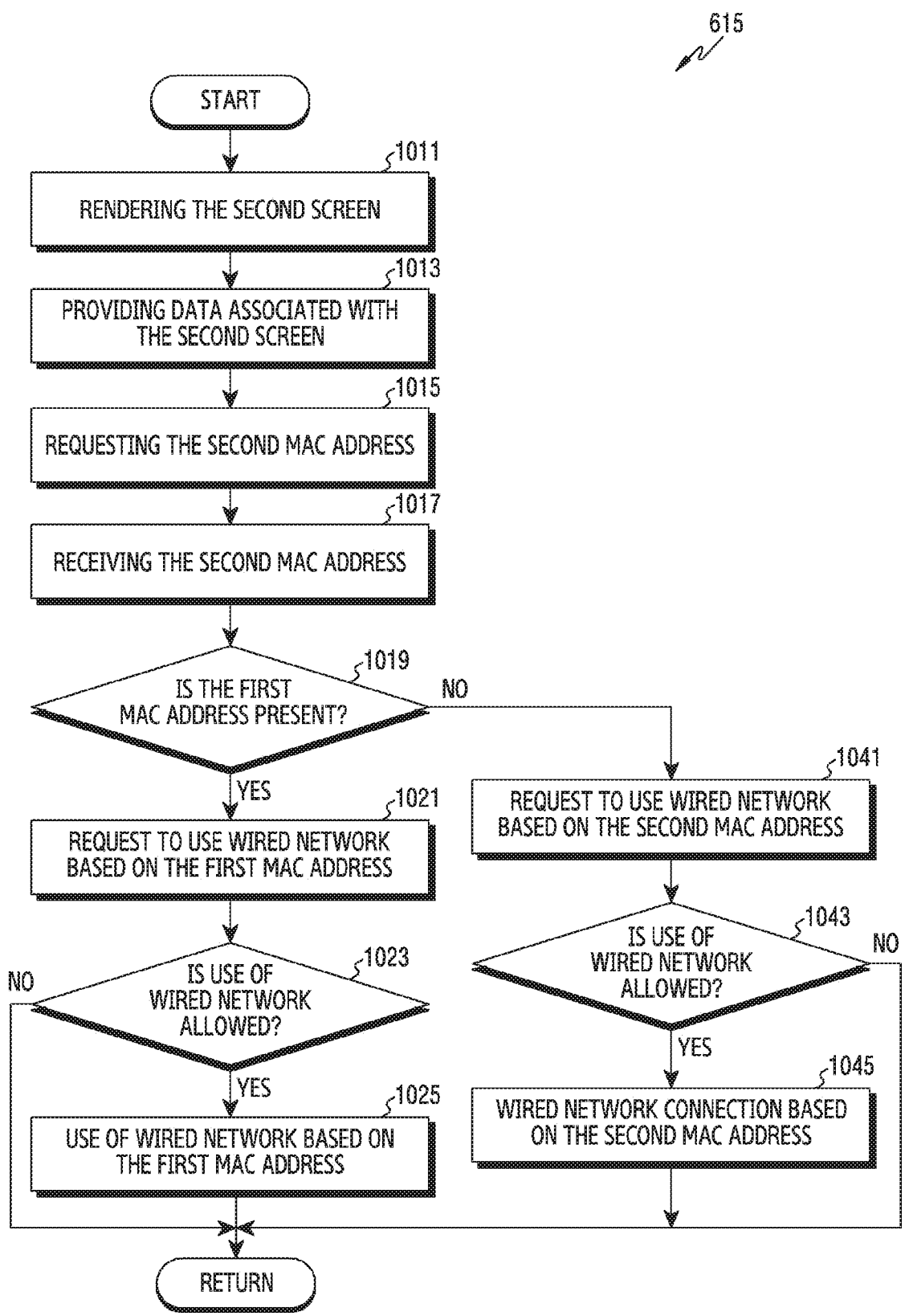
FIG. 10 is a flowchart of the second operation of FIG. 6.
Figure 11A:
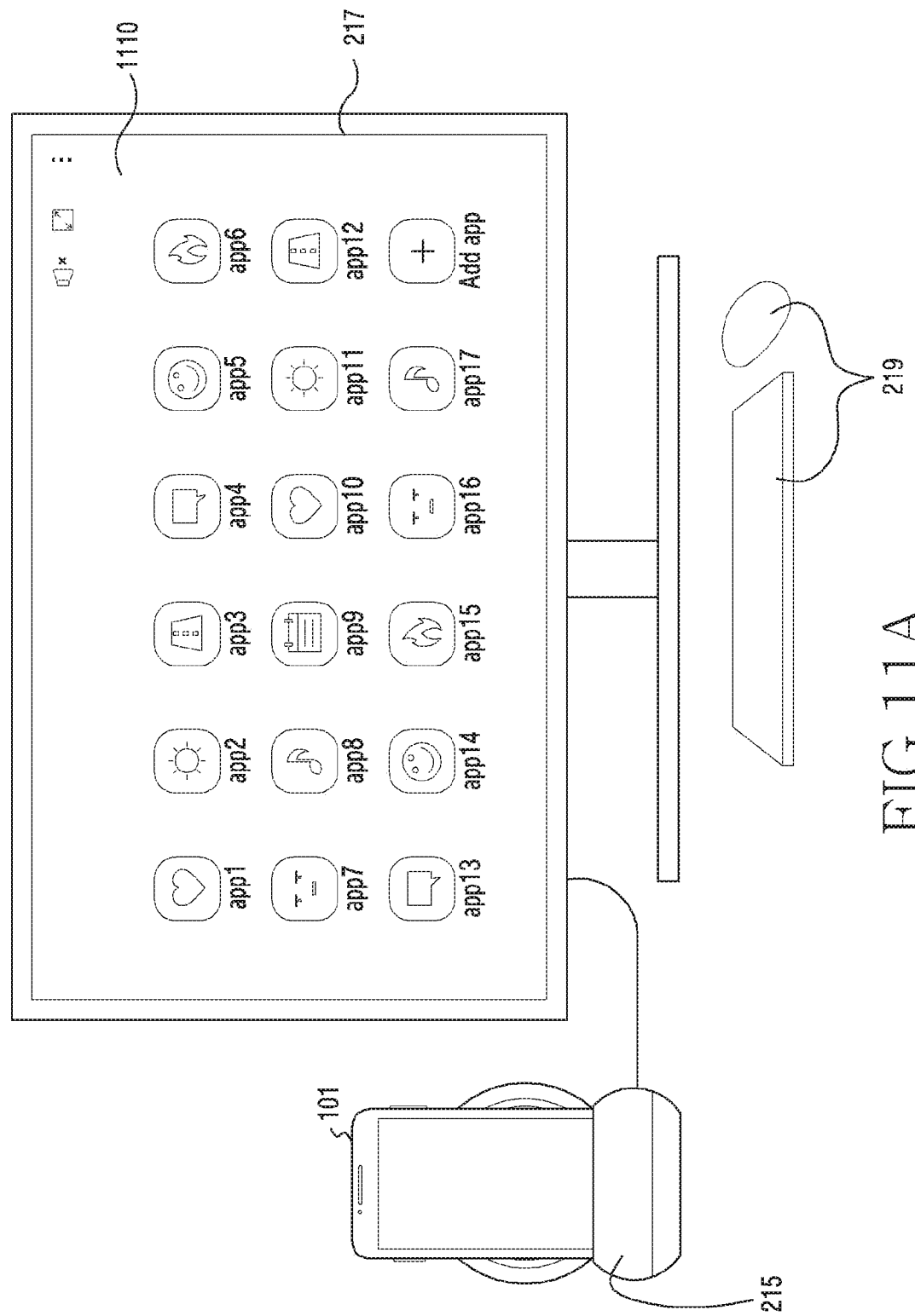
FIG. 11A, FIG. 11B, and FIG. 11C are exemplary views of the second screen of FIG. 10.
Figure 11B:
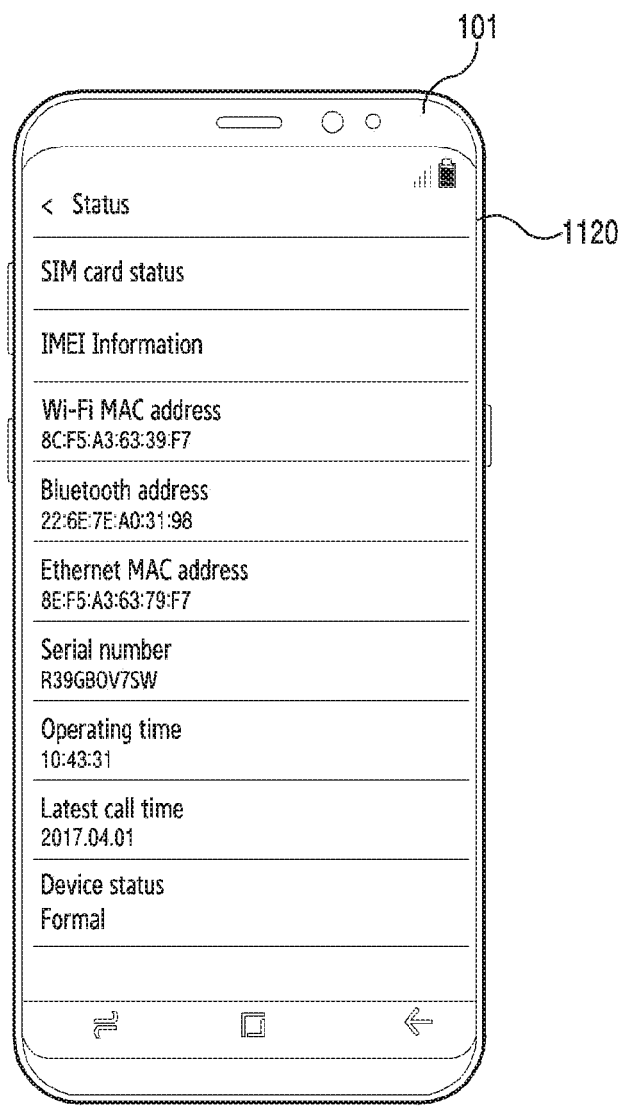
Figure 11C:
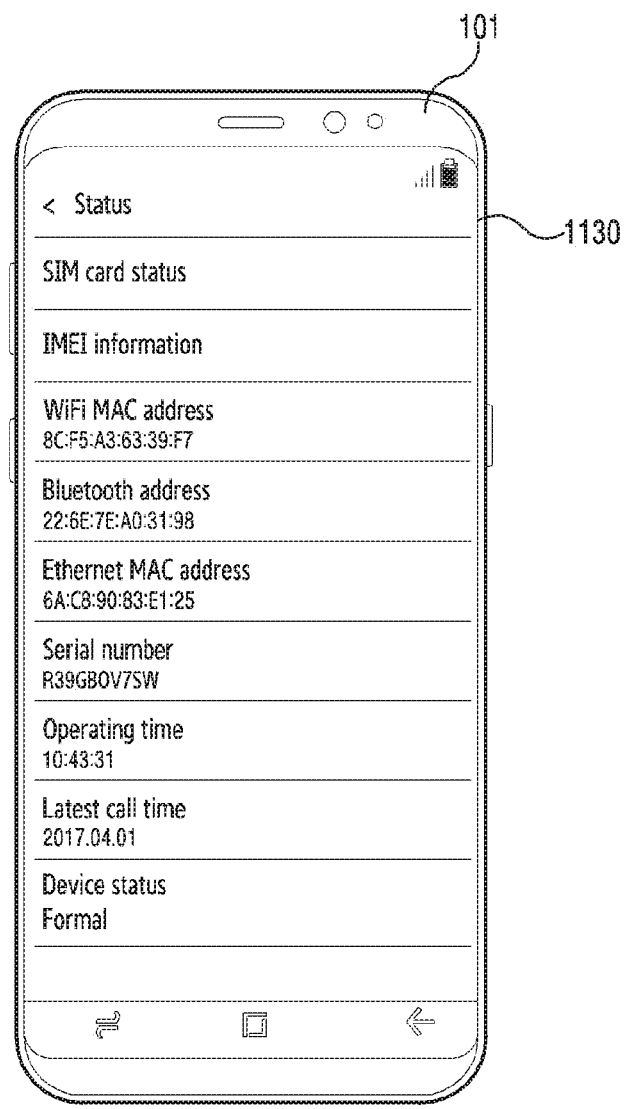

FIG. 10 is a flowchart of the second operation 615 of FIG. 6. Hereinafter, operations of FIG. 10 are at least some of operation 615 of FIG. 6. FIG. 11A, FIG. 11B, and FIG. 11C are exemplary views of the second screen 1110 in FIG. 10.

Referring to FIG. 10, the electronic device 101 renders the second screen 1110 in operation 1011. The processor 120 renders the second screen 1110 in a second format. The second screen 1110 includes a plurality of icons representing a plurality of application programs. In operation 1013, the electronic device 101 provides data associated with the second screen 1110 to the docking device 215. The processor 120 provides data associated with the second screen 1110 to the docking device 215 through a connector. The processor 120 provides data associated with the second screen 1110 to the external output device 217 through the docking device 215. Through this, the processor 120 displays the second screen 1110 through the external output device 217 as shown in FIG. 11A.

The electronic device 101 provide a request for the second MAC address to the docking device 215 in operation 1015. The second MAC address is stored in the docking device 215 for use by the docking device 215 to connect to a wired LAN. In response to this, the electronic device 101 receives the second MAC address from the docking device 215 in operation 1017.

In operation 1019, the electronic device 101 determines whether the first MAC address exists. The processor 120 determines whether the first MAC address is stored separately from the previously stored MAC address.

If it is determined in operation 1019 that the first MAC address exists, the electronic device 101 requests to use the wired network 223 based on the first MAC address in operation 1021. In operation 1021, the electronic device 101 requests to use the wired network 223 based on the first MAC address. At this time, the processor 120 displays the user interface 1120 including at least a portion of the first MAC address through the display device 160 as illustrated in FIG. 11B. The user interface 1120 includes at least a portion of the first MAC address along with at least a portion of the pre-stored MAC address. For example, the processor 120 displays, through the user interface 1120, a WiFi MAC address such as '8C: F5: A3: 63: 79: F7' and a first MAC address such as '8E: F5: A3: 63: 79: FC'. The processor 120 requests the external device 210 to use the wired network 223 through the docking device 215. For example, the processor 120 causes the docking device 215 to request the external device 210 to use the wired network 223 using the first MAC address.

The electronic device 101 determines whether the use of the wired network 223 is permitted in operation 1023. The processor 120 determines whether the use of the wired network 223 is permitted from the external device 210 through the docking device 215. If the use of the wired network 223 is permitted in operation 1023, the electronic device 101 uses the wired network 223 based on the first MAC address in operation 1025. The processor 120 is connected to the wired network 223 through the docking device 215. For example, the electronic device 101 causes the docking device 215 to use the first MAC address for connection to a wired LAN. Through this, the processor 120 uses the wired LAN based on the first MAC address. If the use of the wired network 223 is not permitted and is blocked in operation 1023, the electronic device 101 does not use the wired network 223.

If it is determined in operation 1019 that the first MAC address does not exist, the electronic device 101 requests the use of the wired network 223 based on the second MAC address in operation 1041. At this time, the processor 120 displays the user interface 1130 including at least a portion of the second MAC address through the display device 160 as illustrated in FIG. 11C. The user interface 1130 includes at least a portion of the second MAC address along with at least a portion of the pre-stored MAC address. For example, the processor 120 displays, through the user interface 1130, a WiFi MAC address such as '8C: F5: A 3: 63: 79: F7' and a second MAC address such as 'A6: C8: 90: 83: E1: 25'. The processor 120 requests the external device 210 to use the wired network 223 through the docking device 215. For example, the processor 120 causes the docking device 215 to request the external device 210 to use the wired network 223 using the second MAC address.

The electronic device 101 determines whether the use of the wired network 223 is permitted in operation 1043. The processor 120 determines whether the use of the wired network 223 is permitted from the external device 210 through the docking device 215. If the use of the wired network 223 is permitted in operation 1043, the electronic device 101 uses the wired network 223 based on the second MAC address in operation 1045. The processor 120 is connected to the wired network 223 through the docking device 215. For example, the electronic device 101 causes the docking device 215 to use the second MAC address for connection to a wired LAN. Through this, the processor 120 uses the wired LAN based on the second MAC address. If the use of the wired network 223 is not permitted and is blocked in operation 1043, the electronic device 101 cannot use the wired network 223.

Figure 12:
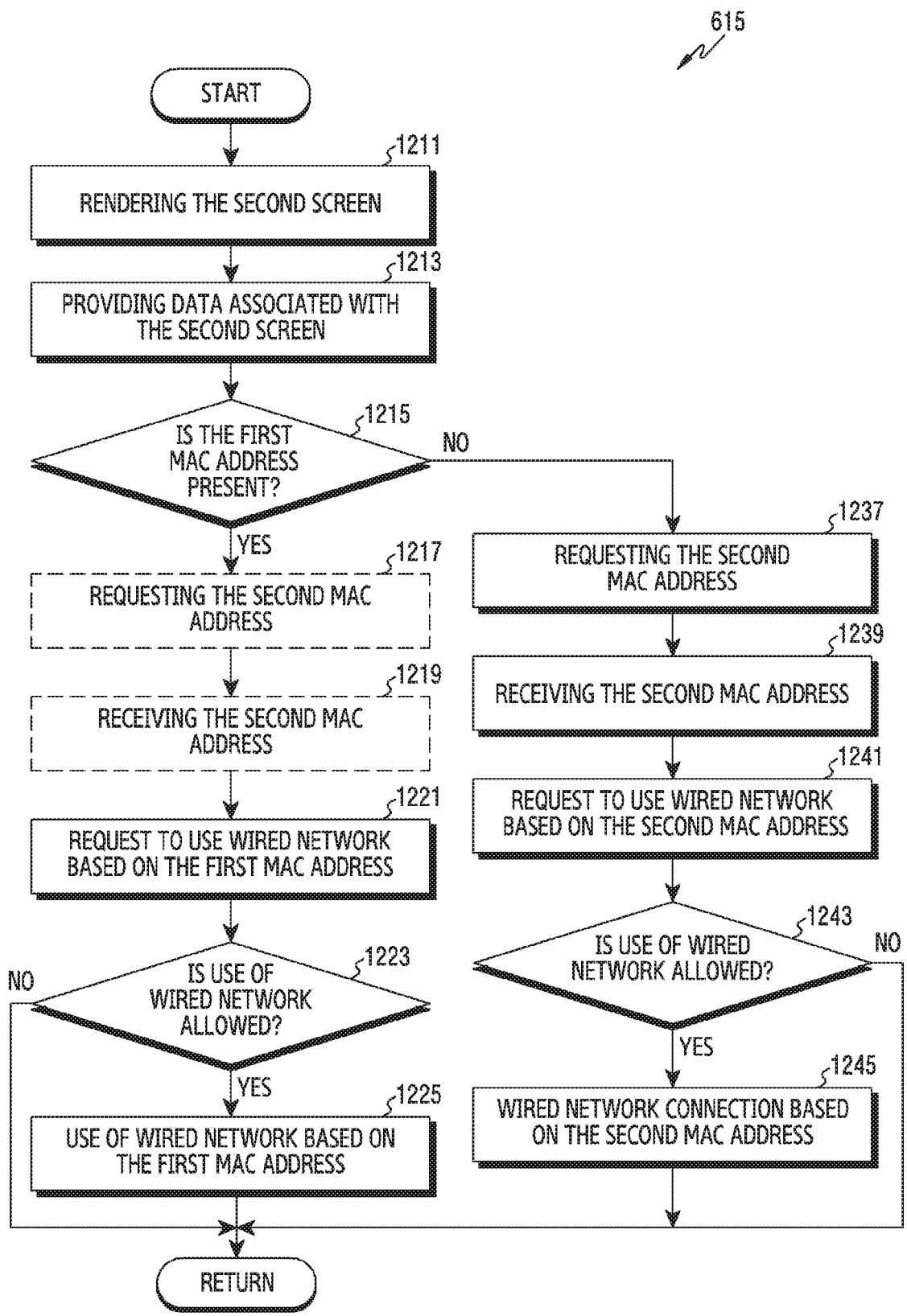
FIG. 12 is a flowchart of the second operation of FIG. 6.

FIG. 12 is a flowchart of the second operation 615 of FIG. 6. Hereinafter, operations of FIG. 12 are at least some of operation 615 of FIG. 6.

Referring to FIG. 12, the electronic device 101 renders the second screen 1110 in operation 1211. The processor 120 renders the second screen 1110 in a second format. The second screen 1110 includes a plurality of icons representing a plurality of application programs. In operation 1213, the electronic device 101 provides data associated with the second screen 1110 to the docking device 215. The processor 120 provides data associated with the second screen 1110 to the docking device 215 through a connector. The processor 120 provides data associated with the second screen 1110 to the external output device 217 through the docking device 215. Through this, the processor 120 displays the second screen 1110 through the external output device 217 as shown in FIG. 11A.

In operation 1215, the electronic device 101 determines whether the first MAC address exists. The processor 120 determines whether the first MAC address is stored separately from the previously stored MAC address.

If it is determined in operation 1215 that the first MAC address exists, the electronic device 101 requests for the use of the wired network 223 based on the first MAC address in operation 1221. At this time, the processor 120 displays the user interface 1120 including at least a portion of the first MAC address through the display device 160 as illustrated in FIG. 11B. The user interface 1120 includes at least a portion of the first MAC address along with at least a portion of the pre-stored MAC address. For example, the processor 120 displays, through the user interface 1120, a WiFi MAC address such as '8C: F5: A 3: 63: 79: F7' and a first MAC address such as '8E: F5: A3: 63: 79: FC'. The processor 120 requests, through the docking device 215, the external device 210 to use the wired network 223. For example, the processor 120 causes the docking device 215 to request the external device 210 to use the wired network 223 using the first MAC address.

According to an embodiment, if it is determined in operation 1215 that the first MAC address exists, the electronic device 101 requests the second MAC address from the docking device 215 in operation 1217. The second MAC address is stored in the docking device 215 for use by the docking device 215 to connect to the wired LAN, and includes, for example, a second MAC address. In response to this, the electronic device 101 receives the second MAC address from the docking device 215 in operation 1219. After receiving the second MAC address from the docking device 215, the electronic device 101 requests to use the wired network 223 based on the first MAC address in operation 1221.

According to another embodiment, if it is determined in operation 1215 that the first MAC address exists, the electronic device 101 receives the second MAC address from the docking device 215 in operation 1219. That is, the processor 120 performs operation 1219 without performing operation 1217. After receiving the second MAC address from the docking device 215, the electronic device 101 requests to use the wired network 223 based on the first MAC address in operation 1221.

According to another embodiment, if it is determined in operation 1215 that the first MAC address exists, the electronic device 101 requests to use the wired network 1223 based on the first MAC address in operation 1221. That is, the processor 120 performs operation 1221 without performing operations 1217 and 1219.

In operation 1223, the electronic device 101 determines whether the use of the wired network 223 is permitted. The processor 120 determines, through the docking device 215, whether the use of the wired network 223 is permitted from the external device 210. If the use of the wired network 223 is permitted in operation 1223, the electronic device 101 uses the wired network 223 based on the first MAC address in operation 1225. The processor 120 is connected to the wired network 223 through the docking device 215. For example, the electronic device 101 causes the docking device 215 to use the first MAC address for connection to a wired LAN. Through this, the processor 120 uses a wired LAN based on the first MAC address. If the use of the wired network 223 is not allowed and is blocked in operation 1223, the electronic device 101 does not use the wired network 223.

If it is determined in operation 1215 that the first MAC address does not exist, the electronic device 101 requests the second MAC address from the docking device 215 in operation 1237. The second MAC address is stored in the docking device 215 for use by the docking device 215 to connect to the wired LAN, and includes, for example, a second MAC address. In response to this, the electronic device 101 receives the second MAC address from the docking device 215 in operation 1239.

After receiving the second MAC address from the docking device 215 in operation 1239, the electronic device 101 requests to use the wired network 223 based on the second MAC address in operation 1241. At this time, the processor 120 displays the user interface 1130 including at least a portion of the second MAC address through the display device 160 as illustrated in FIG. 11C. The user interface 1130 includes at least a portion of the second MAC address along with at least a portion of the pre-stored MAC address. For example, the processor 120 displays, through the user interface 1130, the WiFi MAC address such as '8C: F5: A 3: 63: 79: F7' and the second MAC address such as 'A6: C8: 90: 83: E1: 25'. The processor 120 requests the external device 210 to use the wired network 223 through the docking device 215. For example, the processor 120 causes the docking device 215 to request the external device 210 to use the wired network 223 using the second MAC address.

The electronic device 101 determines whether the use of the wired network 223 is permitted in operation 1243. The processor 120 determines whether the use of the wired network 223 is permitted from the external device 210 through the docking device 215. If the use of the wired network 223 is permitted in operation 1243, the electronic device 101 uses the wired network 223 based on the second MAC address in operation 1245. The processor 120 is connected to the wired network 223 through the docking device 215. For example, the electronic device 101 causes the docking device 215 to use a second MAC address for connection to a wired LAN. Through this, the processor 120 uses a wired LAN based on the second MAC address. If the use of the wired network 223 is not allowed and is blocked in operation 1243, the electronic device 101 does not use the wired network 223.

Figure 13:
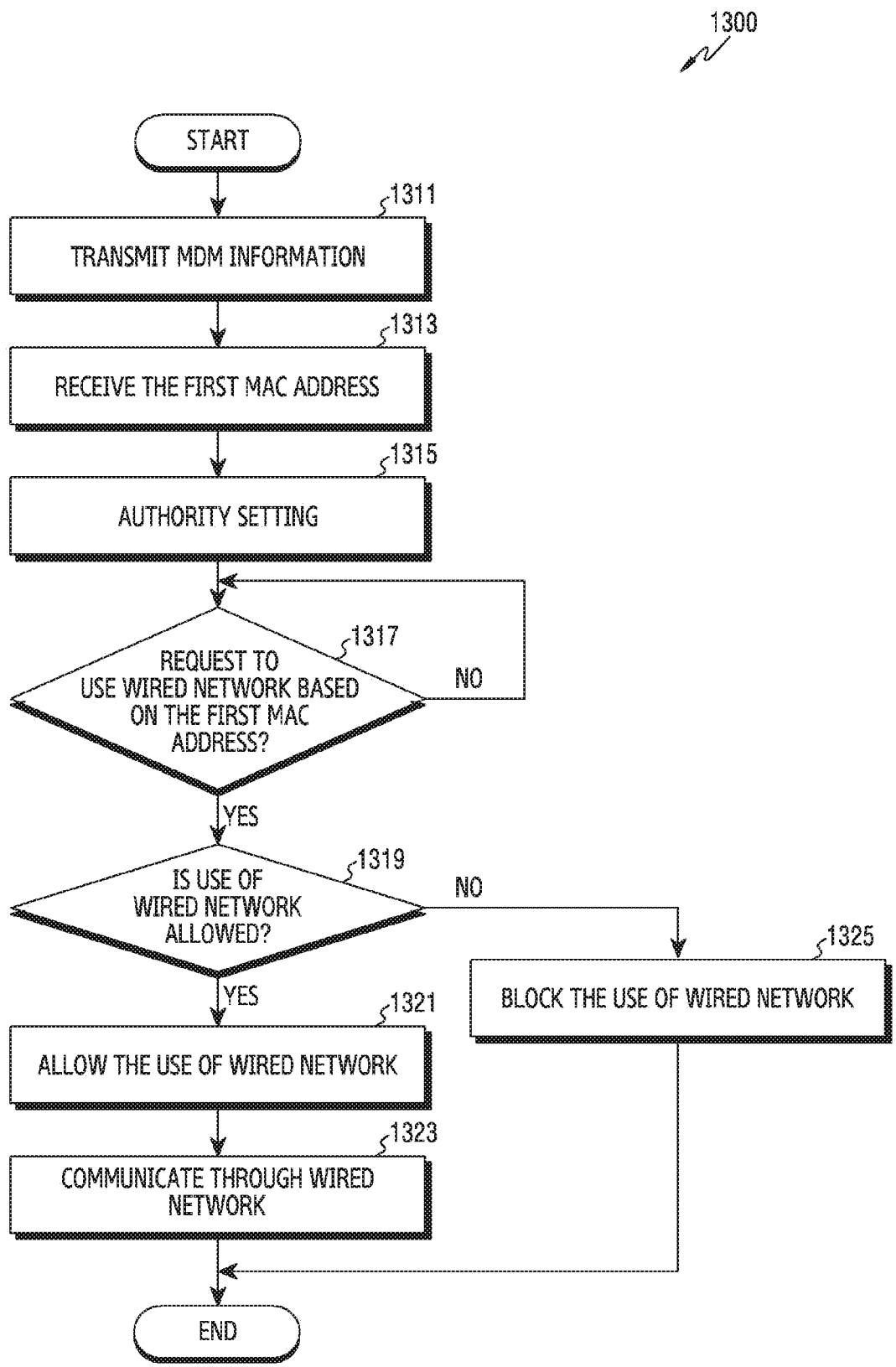
FIG. 13 is a flowchart of a method of operating an external device according to an embodiment.

FIG. 13 is a flowchart of an operation method 1300 of an external device 210 according to an embodiment.

Referring to FIG. 13, the external device 210 transmits MDM information in operation 1311. The external device 210 periodically transmits MDM information. The external device 210 transmits MDM information for use of the wired network 223 through the wireless network 221. For example, the external device 210 transmits MDM information to the MDM client of the electronic device 101 based on a predetermined time, a location, or an event.

The external device 210 receives the first MAC address from the electronic device 101 in operation 1313. The external device 210 receives the first MAC address of the electronic device 101 through the wireless network 221. According to an embodiment, the external device 210 reads the first MAC address from the electronic device 101. The external device 210 receives user information of the electronic device 101 together with the first MAC address. For example, the user information includes at least one of user name, contact information, or affiliation information. The external device 210 registers the first MAC address in response to user information.

In operation 1315, the external device 210 sets authority for use of the wired network 223 of the electronic device 101. The external device 210 sets authority for use of the wired network 223 of the electronic device 101 based on the user information. For example, the external device 210 allows or blocks the use of the wired network 223 for the electronic device 101, and determines the use range of the wired network 223 for the electronic device 101. The external device 210 registers the authority of the electronic device 101 corresponding to the first MAC address.

In operation 1317, the external device 210 receives a request to use the wired network 223 based on the first MAC address. The external device 210 receives a request to use the wired network 223 from the electronic device 101 based on the first MAC address through the docking device 215.

The external device 210 determines whether to allow the use of the wired network 223 based on the first MAC address in operation 1319. The external device 210 identifies the authority of the electronic device 101 based on the first MAC address. The external device 210 determines whether the electronic device 101 is set to allow the use of the wired network 223.

If it is determined in operation 1319 to allow the use of the wired network 223, the external device 210 allows the use of the wired network 223 for the electronic device 101 in operation 1321. The external device 210 allows the use of the wired network 223 for the electronic device 101 through the docking device 215. The external device 210 communicates with the electronic device 101 through the wired network 223 in operation 1323. The external device 210 communicates with the electronic device 101 based on the first MAC address through the docking device 215. The external device 210 communicates with the electronic device 101 based on the scope of use of the wired network 223 in the authority of the electronic device 101.

If it is determined in operation 1319 that the use of the wired network 223 is not permitted, the external device 210 blocks the use of the wired network 223 for the electronic device 101 in operation 1325. The external device 210 does not communicate with the electronic device 101 through the wired network 223.

Figure 14:
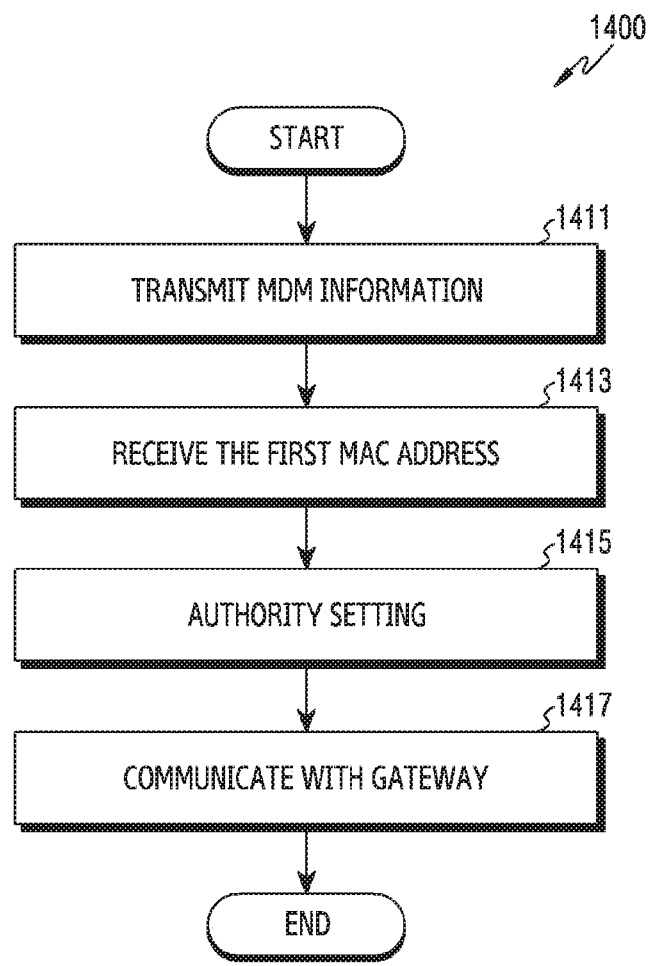
FIG. 14 is a flowchart of a method of operating an external device according to another embodiment.

FIG. 14 is a flowchart of an operation method 1400 of an external device 210 according to another embodiment.

Referring to FIG. 14, the external device 210 transmits MDM information in operation 1411. The external device 210 periodically transmits MDM information. The external device 210 transmits MDM information for use of the wired network 223 through the wireless network 221. For example, the external device 210 transmits MDM information to the MDM client of the electronic device 101 based on a predetermined time, a location, or an event.

The external device 210 receives the first MAC address from the electronic device 101 in operation 1413. The external device 210 receives the first MAC address of the electronic device 101 through the wireless network 221. According to an embodiment, the external device 210 reads the first MAC address from the electronic device 101. The first MAC address includes, for example, the first MAC address. The external device 210 receives user information of the electronic device 101 together with the first MAC address. For example, the user information includes at least one of user name, contact information, or affiliation information. The external device 210 registers the first MAC address in response to user information.

In operation 1415, the external device 210 sets authority for using the wired network 223 of the electronic device 101. The external device 210 sets authority for using the wired network 223 of the electronic device 101 based on the user information. For example, the external device 210 allows or blocks the use of the wired network 223 for the electronic device 101, and determines the use range of the wired network 223 for the electronic device 101. The external device 210 registers the authority of the electronic device 101 corresponding to the first MAC address.

The external device 210 communicates with the gateway 213 in operation 1417. The external device 210 transmits the first MAC address and authority of the electronic device 101 to the gateway 213. The external device 210 further transmits the user information along with the first MAC address and authority of the electronic device 101 to the gateway 213. Thereafter, if the electronic device 101 is allowed to use the wired network 223, the external device 210 communicates with the electronic device 101 through the gateway 213. The external device 210 communicates with the electronic device 101 based on the first MAC address through the docking device 215. The external device 210 communicates with the electronic device 101 based on the scope of use of the wired network 223 in the authority of the electronic device 101.

Figure 15:
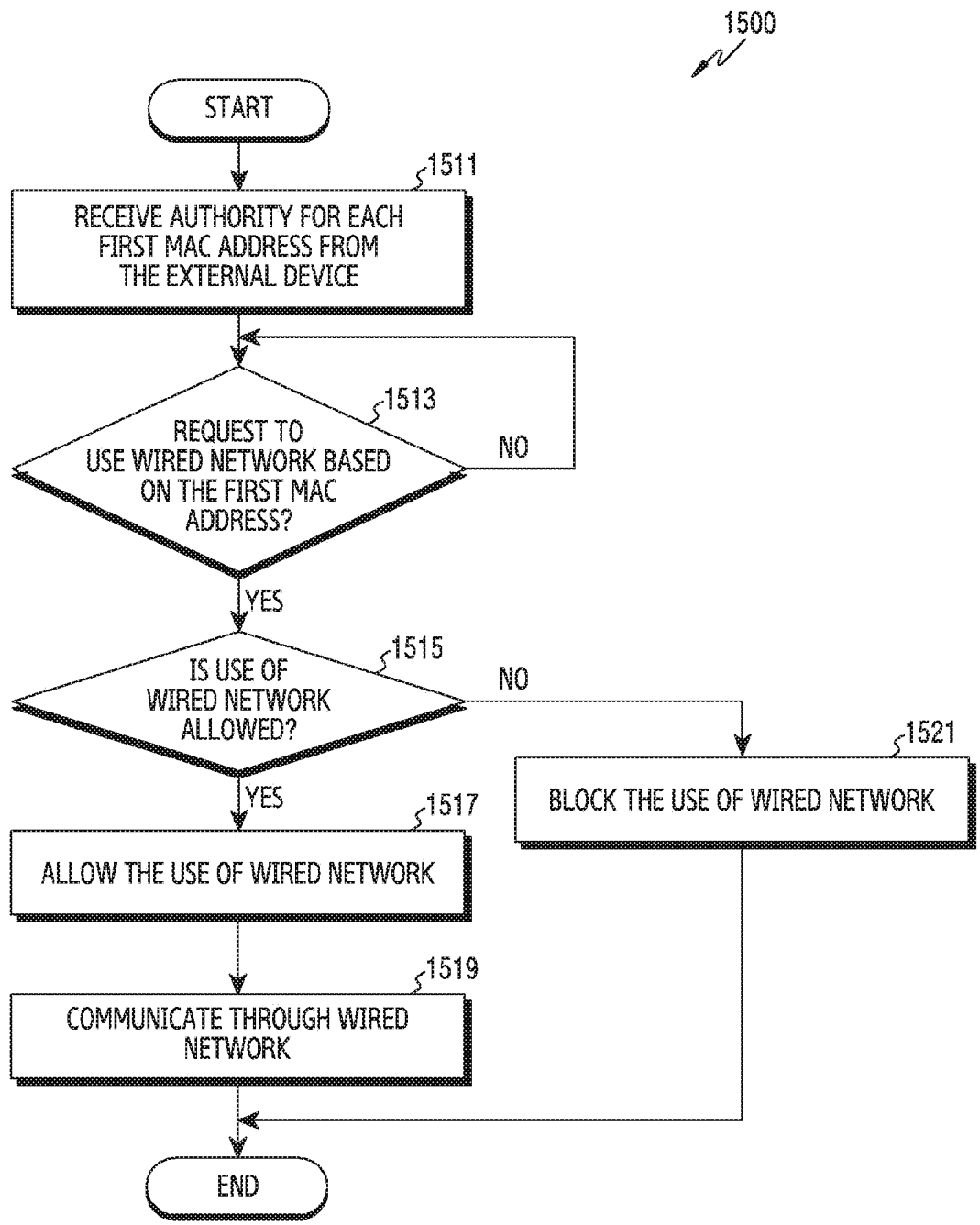
FIG. 15 is a flowchart of a method of operating a gateway according to another embodiment.

FIG. 15 is a flowchart of an operation method 1500 of a gateway 213 according to another embodiment.

Referring to FIG. 15, the gateway 213 receives authority for each first MAC address from the external device 210 in operation 1511. The gateway 213 receives the first MAC address and authority of the electronic device 101 from the external device 210. The gateway 213 stores authority of the electronic device 101 corresponding to the first MAC address. The gateway 213 further receives user information along with the first MAC address and authority of the electronic device 101. The gateway 213 stores user information and authority of the electronic device 101 corresponding to the first MAC address.

In operation 1513, the gateway 213 receives a request to use the wired network 223 based on the first MAC address. The gateway 213 receives a request to use the wired network 223 from the electronic device 101 based on the first MAC address through the docking device 215. The gateway 213 determines whether to allow the use of the wired network 223 based on the first MAC address in operation 1515. The gateway 213 identifies the authority of the electronic device 101 based on the first MAC address. The gateway 213 determines whether the electronic device 101 is set to allow the use of the wired network 223.

If it is determined in operation 1515 that the use of the wired network 223 is permitted, the gateway 213 allows the use of the wired network 223 for the electronic device 101 in operation 1517. The gateway 213 allows the use of the wired network 223 for the electronic device 101 through the docking device 215. In operation 1519, the gateway 213 communicates with the electronic device 101 through the wired network 223. The gateway 213 communicates with the electronic device 101 based on the first MAC address through the docking device 215. Through this, the gateway 213 relays communication between the electronic device 101 and the external device 210.

If it is determined in operation 1515 that the use of the wired network 223 is not permitted, the gateway 213 blocks the use of the wired network 223 for the electronic device 101 in operation 1521. The gateway 213 does not communicate with the electronic device 101 through the wired network 223.

Operation method of the electronic device 101 according to various embodiments, includes a first operation performed when the electronic device 101 is not connected to the external output device 217 and a second operation performed while the docking device 215 is connected to the wired LAN when the electronic device 101 is inserted into the docking device 215 using a connector and connected to the external output device 217 through the docking device 215.

According to various embodiments, the first operation includes an operation of displaying a first screen including a plurality of icons representing a plurality of application programs in a first format.

According to various embodiments, the second operation includes rendering a second screen including a plurality of icons in a second format, providing the data associated with the second screen to the external output device 217 through the connector so that the external output device 217 displays the second screen, and connecting the electronic device 101 to the wired LAN through the connector using the first MAC address shared with the external device 210 on the wired LAN.

According to various embodiments, the connector includes a universal serial bus (USB) connector.

According to various embodiments, the method further includes receiving mobile device management (MDM) information from the external device 210 and generating a first MAC address in response to the MDM information.

According to various embodiments, the method of the electronic device 101 further includes generating a first MAC address using the WiFi MAC address.

According to various embodiments, generating the first MAC address includes generating the first MAC address by processing the WiFi MAC address with bit masking algorithm.

According to various embodiments, the second operation further includes receiving the second MAC address stored in the docking device 215 from the docking device 215 and after receiving the second MAC address, causing the docking device 215 to use the first MAC address to connect to the wired LAN.

According to various embodiments, the second operation further includes providing a request for the second MAC address to the docking device 215 and receiving the second MAC address from the docking device 215 after providing the request.

According to various embodiments, the second operation further includes displaying a user interface (UI) including at least a portion of the first MAC address.

Non-transitory computer-readable storage medium according to various embodiments stores one or more programs for performing the first operation performed based on that the electronic device 101 is not connected to the external output device 217, and a second operation performed when the electronic device 101 is inserted into the external docking device 215 using the connector and connected to the external output device 217 through the docking device 215.

According to various embodiments, the first operation includes an operation of displaying a first screen including a plurality of icons representing a plurality of application programs in a first format.

According to various embodiments, the second operation includes rendering a second screen including a plurality of icons in a second format, providing the data associated with the second screen to 217 to the external output device through the connector so that the external output device 217 displays the second screen, and connecting the electronic device 101 to the wired LAN through the connector using the first MAC address shared with the external device 210 on the wired LAN.

According to various embodiments, the program further executes an operation of receiving mobile device management (MDM) information from the external device 210 and an operation of generating a first MAC address in response to the MDM information.

According to various embodiments, the program further performs an operation of generating a first MAC address using a WiFi MAC address.

According to various embodiments, generating the first MAC address includes generating a first MAC address by processing WiFi MAC address with bit masking algorithm.

According to various embodiments, the electronic device 101 generates a unique MAC address and use it to connect to the wired network 223. Through this, even if the electronic device 101 is inserted into the docking device 215, the electronic device 01 uses the wired network 223 based on the unique MAC address. Accordingly, since the external device 210 is able to identify the electronic device 101, the external device 210 allows or blocks the use of the wired network 223 for the electronic device 101, and sets the range of use of the wired network 223 for the electronic device 101.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising: a housing; a display exposed through a first portion of the housing; a wireless communication circuit disposed inside the housing; an electrical connector exposed through a second portion of the housing; a processor electrically connected to the display, the wireless communication circuit and the electrical connector; and a memory electrically connected to the processor, wherein the memory stores instructions that, when executed, cause the processor to: display, in a first operation, a first screen including a plurality of icons, in a first format, representing a plurality of application programs on the display, determine whether the electronic device is connected to an external display device through a docking device, when the electronic device is connected to the external display device through the docking device, in a second operation: render a second screen including the plurality of icons in a second format, provide data related to the second screen to the external display device through the connector for the external display device to display the second screen, connect the electronic device to the wired LAN through the electrical connector using a first media access control (MAC) address shared with an external device on the wired LAN while the docking device is connected to a wired local area network (LAN), receive a second MAC address stored in the docking device from the docking device, determine whether the first MAC address exists, if the first MAC address exists, request the use of the wired LAN based on the first MAC address, and if the first MAC address does not exist, request the use of the wired LAN based on the second MAC address, determine whether the use of the wired LAN based on at least one of the first MAC address or the second MAC address is permitted in order to block the use of the wired LAN, and wherein the first MAC address is generated in the electronic device and registered in the external device with a usage authority of the wired LAN for the electronic device before the electronic device is connected to the external display device through the docking device.

2. The electronic device of claim 1, wherein the connector includes a universal serial bus (USB) connector.

3. The electronic device of claim 1, wherein the instructions cause the processor to:
receive mobile device management (MDM) information from the external device, and
generate the first MAC address in response to receiving the MDM information.

4. The electronic device of claim 2, wherein the instructions cause the processor to generate the first MAC address using a WiFi MAC address.

5. The electronic device of claim 4, wherein the instructions cause the processor to generate the first MAC address by processing the WiFi MAC address with a bit masking algorithm.

6. The electronic device of claim 1, wherein the instructions cause the processor, in the second operation, to:
after receiving the second MAC address, cause the docking device to use the first MAC address to connect to the wired LAN.

7. The electronic device of claim 1, wherein the instructions cause the processor in the second operation to:
provide a request for a second MAC address to the docking device, and
after providing the request, receive the second MAC address from the docking device.

8. The electronic device of claim 1, wherein the instructions cause the processor in the second operation to display a user interface (UI) including at least a portion of the first MAC address on the display.

9. A method of the electronic device, comprising:
a first operation performed based on that the electronic device is not connected to an external display device; and
a second operation performed while a docking device is connected to a wired local area network (LAN) when the electronic device is inserted into the docking device using a connector and connected to the external display device through the docking device,
wherein the first operation includes:
displaying a first screen including a plurality of icons representing a plurality of application programs in a first format, and
wherein the second operation includes:
rendering a second screen including the plurality of icons in a second format;
providing data associated with the second screen to the external display device through the connector for the external display device to display the second screen;
connecting the electronic device to the wired LAN through the connector using a first media access control (MAC) address shared with an external device on the wired LAN,
receiving a second MAC address stored in the docking device from the docking device
determining whether the first MAC address exists, requesting the use of the wired LAN based on the first MAC address, if the first MAC address exists, and requesting the use of the wired LAN based on the second MAC address, if the first MAC address does not exist, determining whether the use of the wired LAN based on at least one of the first MAC address or the second MAC address is permitted in order to block the use of the wired LAN, and wherein the first MAC address is generated in the electronic device and registered in the external device with a usage authority of the wired LAN for the electronic device before the electronic device is connected to the external display device through the docking device.

10. The method of claim 9, wherein the connector includes a universal serial bus (USB) connector.

11. The method of claim 9, further comprising, receiving mobile device management (MDM) information from the external device; and generating the first MAC address in response to receiving the MDM information.

12. The method of claim 10, further comprising generating the first MAC address using a WiFi MAC address.

13. The method of claim 9, wherein the second operation further comprises:

after receiving the second MAC address, causing the docking device to use the first MAC address to connect to the wired LAN.

14. The method of claim 9, wherein the second operation further comprises:

providing a request for a second MAC address to the docking device; and after providing the request, receiving the second MAC address from the docking device.

15. A non-transitory computer-readable storage medium storing one or more programs for performing the steps of:

performing a first operation based on that an electronic device is not connected to an external output device; and performing a second operation while a docking device is connected to a wired local area network (LAN) when the electronic device is inserted into the docking device using a connector and connected to the external output device through the docking device, wherein the first operation includes displaying a first screen including a plurality of icons representing a plurality of application programs in a first format, wherein the second operation includes: rendering a second screen including the plurality of icons in a second format, providing data associated with the second screen to the external output device through the connector so that the external output device displays the second screen, and connecting the electronic device through the connector to the wired LAN using the first media access control (MAC) address shared with an external device on the wired LAN, receiving a second MAC address stored in the docking device from the docking device, determining whether the first MAC address exist, requesting the use of the wired LAN based on the first MAC address, if the first MAC address exists, and requesting the use of the wired LAN based on the second MAC address, if the first MAC address does not exist, determining whether the use of the wired LAN based on at least one of the first MAC address or the second MAC address is permitted in order to block the use of the wired LAN, and wherein the first MAC address is generated in the electronic device and registered in the external device with a usage authority of the wired LAN for the electronic device before the electronic device is connected to the external display device through the docking device.

* * * * *